(12) United States Patent
Rekimoto

(10) Patent No.: US 9,122,385 B2
(45) Date of Patent: Sep. 1, 2015

(54) INPUT METHOD AND INPUT APPARATUS

(71) Applicant: SONY CORPORATION, Tokyo (JP)

(72) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/263,155

(22) Filed: Apr. 28, 2014

(65) Prior Publication Data

US 2014/0240266 A1    Aug. 28, 2014

Related U.S. Application Data

(63) Continuation of application No. 14/095,356, filed on Dec. 3, 2013, now Pat. No. 9,007,325, which is a continuation of application No. 11/826,805, filed on Jul. 18, 2007, now Pat. No. 8,704,773, which is a continuation of application No. 10/514,393, filed as application No. PCT/JP03/05949 on May 13, 2003, now Pat. No. 8,570,277.

(30) Foreign Application Priority Data

May 16, 2002  (JP) .................................. 2002-141741
May 20, 2002  (JP) .................................. 2002-144951

(51) Int. Cl.
G06F 3/0484    (2013.01)
G06F 1/16      (2006.01)
(Continued)

(52) U.S. Cl.
CPC ............ *G06F 3/04845* (2013.01); *G06F 1/169* (2013.01); *G06F 1/1616* (2013.01); *G06F 1/1626* (2013.01); *G06F 3/016* (2013.01); *G06F 3/03547* (2013.01); *G06F 3/041* (2013.01); *G06F 3/0485* (2013.01);
(Continued)

(58) Field of Classification Search
CPC ............... G06F 1/1626; G06F 1/169–1/1692; G06F 2203/0382; G06F 2203/0339; G06F 3/0488; G06F 2203/04806; G06F 2203/04808
USPC ...................... 178/18.01–19.07; 345/173–178
See application file for complete search history.

(56) References Cited

U.S. PATENT DOCUMENTS 5,543,588 A * 8/1996 Bisset et al. ............... 178/18.06
5,825,352 A   10/1998 Bisset et al.
(Continued)

FOREIGN PATENT DOCUMENTS

EP    0116730    8/1984
EP    0556999    8/1993
(Continued)

OTHER PUBLICATIONS

The Supplementary Search Report issued in European Patent Application No. 03723346.7, dated Nov. 4, 2008.
(Continued)

*Primary Examiner* — Michael Pervan
(74) *Attorney, Agent, or Firm* — Sherr & Jiang, PLLC

(57) ABSTRACT

There is provided an apparatus including a circuitry configured to initiate an operation command in response to a first moving operation of a first operator on a first operation surface provided on a first surface of a housing body, wherein the first surface is provided on a substantially opposite side of the housing body from a second surface on which a display is provided, and wherein the display is configured to display a result of the initiated operation command.

18 Claims, 24 Drawing Sheets

(51) Int. Cl.
    *G06F 3/01* (2006.01)
    *G06F 3/0354* (2013.01)
    *G06F 3/041* (2006.01)
    *G06F 3/0485* (2013.01)

(52) U.S. Cl.
    CPC .......... *G06F 2203/0339* (2013.01); *G06F 2203/04112* (2013.01); *G06F 2203/04806* (2013.01); *G06F 2203/04808* (2013.01)

(56) References Cited

U.S. PATENT DOCUMENTS

| | | | |
|---|---|---|---|
| 5,914,705 A | 6/1999 | Johnson et al. | |
| 6,115,482 A | 9/2000 | Sears et al. | |
| 6,275,213 B1 | 8/2001 | Tremblay et al. | |
| 6,323,846 B1 * | 11/2001 | Westerman et al. | 345/173 |
| 6,369,803 B2 | 4/2002 | Brisebois et al. | |
| 7,009,599 B2 | 3/2006 | Pihlaja | |
| 7,030,861 B1 | 4/2006 | Westerman et al. | |
| 7,158,123 B2 | 1/2007 | Myers et al. | |
| 7,649,562 B2 | 1/2010 | Misawa et al. | |
| 2002/0118175 A1 * | 8/2002 | Liebenow et al. | 345/168 |
| 2002/0149561 A1 | 10/2002 | Fukumoto et al. | |
| 2002/0158838 A1 * | 10/2002 | Smith et al. | 345/156 |
| 2003/0142081 A1 | 7/2003 | Iizuka et al. | |

FOREIGN PATENT DOCUMENTS

| | | |
|---|---|---|
| EP | 0789321 | 8/1997 |
| JP | 62-242220 | 10/1987 |
| JP | 01-281518 | 11/1989 |
| JP | 03-037063 | 8/1991 |
| JP | 06-043998 | 2/1994 |
| JP | 06-111695 | 4/1994 |
| JP | 09-173979 | 7/1997 |
| JP | 09-231000 | 9/1997 |
| JP | 10-064386 | 3/1998 |
| JP | 11-162277 | 6/1999 |
| JP | 11-194863 | 7/1999 |
| JP | 11-312050 | 11/1999 |
| JP | 2000-137576 | 5/2000 |
| JP | 2000163031 | 6/2000 |
| JP | 2000-357050 | 12/2000 |
| JP | 2002-091649 | 3/2002 |
| WO | WO02/12991 | 2/2002 |

OTHER PUBLICATIONS

International Search Report, dated Aug. 26, 2003, from PCT/JP03/05949 (2 pages).

* cited by examiner

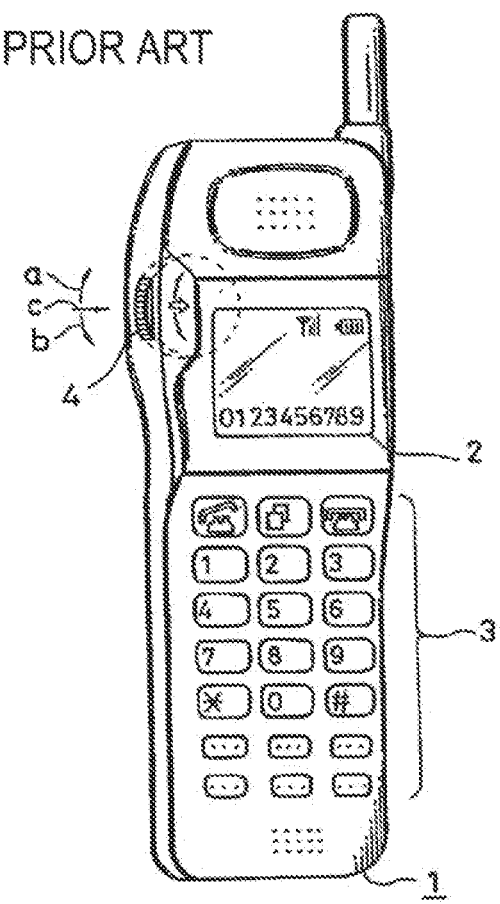
FIG. 1 - PRIOR ART
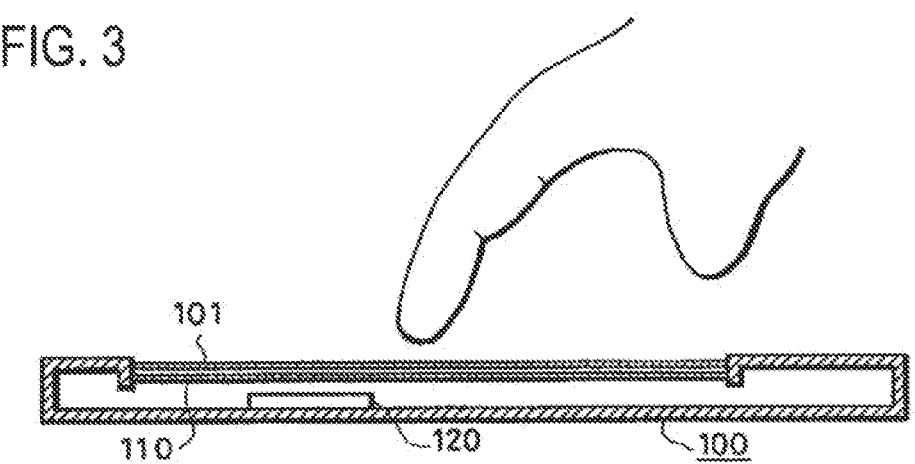
FIG. 3

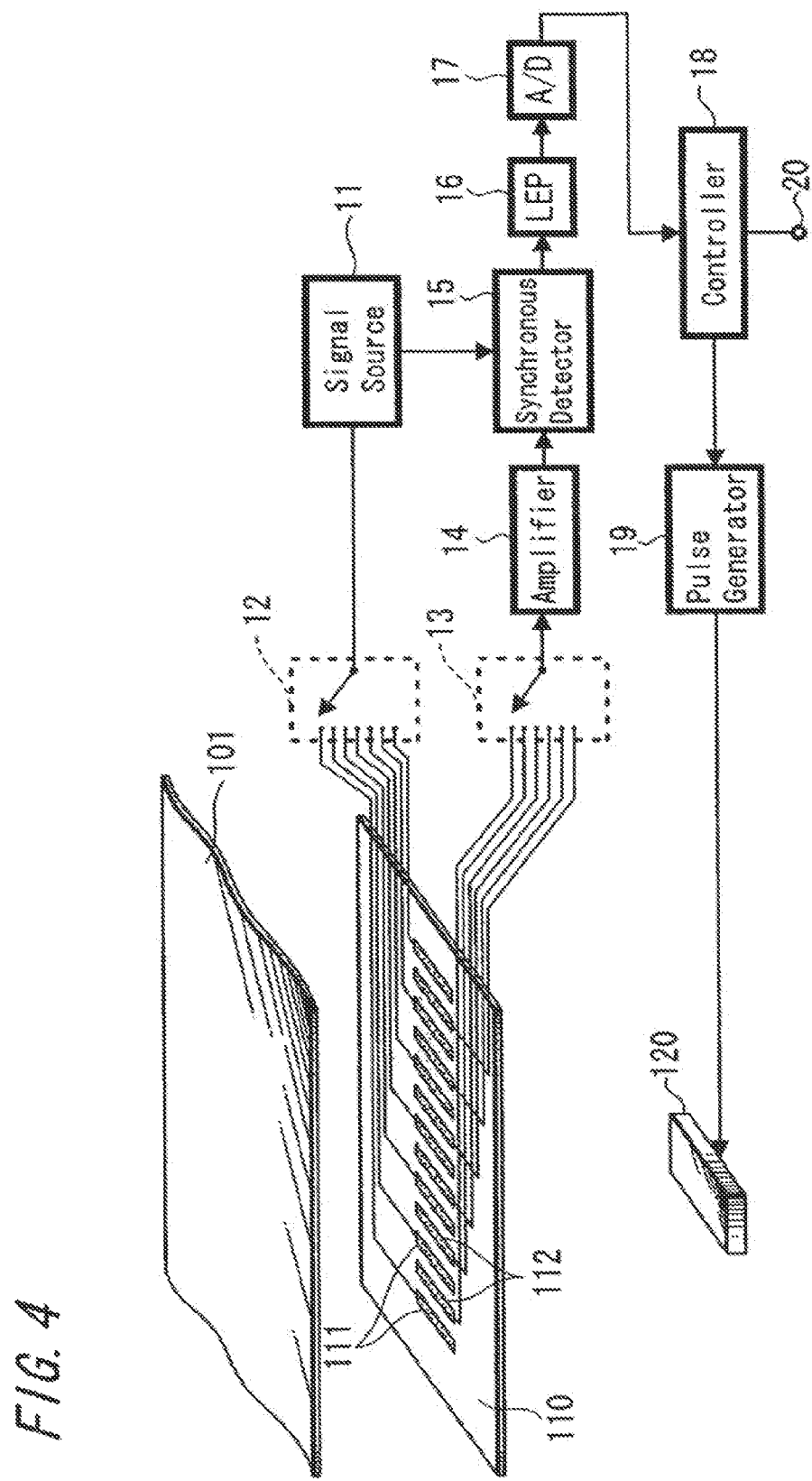

INPUT METHOD AND INPUT APPARATUS

CROSS REFERENCE TO PRIOR APPLICATION

This application is a continuation of U.S. Pat. No. 14/095,356 (filed on Dec. 3, 2013), which is a continuation of U.S. Pat. No. 11/826,805 (filed on Jul. 18, 2007), which is a continuation of U.S. Pat. No. 10/514,393 (filed on Jun. 24, 2005), which is a National Stage Patent Application of PCT International Patent Application No. PCT/JP03/05949 (filed on May 13, 2003) under 35 U.S.C. §371, which claims priority to Japanese Patent Application Nos. 2002-144951 (filed on May 20, 2002) and 2002-141741 (filed on May 16, 2002), which are all hereby incorporated by reference in their entirety.

TECHNICAL FIELD

The present invention relates to an input method and an input apparatus suitable for operating electronic equipment constituted as a portable type in a comparatively small size.

BACKGROUND ART

Heretofore, since it is difficult to arrange a keyboard such as for a general computer apparatus in electronic equipment such as PDA (Personal Digital Assistants) which is constituted as a portable type in a comparatively small size, electronic equipment which is provided with an input means referred to as a touch panel has been practically produced where various inputs can be carried out by using a finger or a dedicated pen so as to be contacted with the face of the panel.

For example, in a case when a touch panel is constituted on a display panel such as an LCD panel, it becomes possible to be adaptable for complicated inputs by accepting the functional input allotted to the button or key if operation buttons, a keyboard or the like is displayed on the display panel first and then the portion of each portion of the displayed buttons and keys is touched even though it is a panel of a comparatively small area.

On the other hand, electronic equipment provided with an input apparatus referred to as a jog dial for another input apparatus other than a touch panel was practically produced in order to carry out complicated input operations easily in electronic equipment such as a portable telephone terminal. FIG. 1 is a diagram showing one example of a portable telephone terminal provided with a conventional jog dial type input apparatus. In this example, a display panel 2, a dial key 3 and the like are disposed on the front face of a housing which constitutes a portable telephone terminal 1 and a jog dial 4 is disposed on a side face of the housing.

The jog dial 4 is constituted by a rotational member which is rotatable one way and the other as shown by arrows a and b in FIG. 1 and moreover it can be pushed down to a direction of a rotational axis as shown by an arrow c in FIG. 1. In this case, it is designed such that a click feeling is contained to a certain degree with respect to the rotation of the rotational member and a mechanical click is to be generated whenever, for example, the rotational member is made rotated by a certain angle in a range of several tens' degree.

It is possible by providing such a jog dial 4 to carry out various operations which are combined by the rotational operation and the push-down operation. For example, selection of input items (for example, input characters) can be carried out by rotating it in an arrow a or b direction and the selected item can be decided by pushing it down in a direction shown as the arrow c, so that there is an effect that various operations can be carried out easily by using a single operation means. Then, it is constituted such that a mechanical click is to be generated whenever rotated by a certain angle as mentioned above, so that a user can comprehend relying upon the number of clicks generated how much degree (for example, how many steps) it was inputted and the operationality is improved.

Now, in case of a conventional touch panel, there was a problem that a user who is carrying out the operation cannot judge whether or not it was correctively touched until an input corresponding to the touched position is executed after the panel face of the equipment is touched and a sensor in the equipment detects the contact in either case when a finger is used or when a dedicated pen is used.

In a case when, for example, a place where an operation button is displayed on a display panel is touched by an input pen, if such an operation as making a displayed color of the displayed operation button to be reversed is carried out after the condition of being touched is detected by a sensor in the equipment, it is notified that an input is done and it is comprehended that the operation was performed by the contact just after the display panel is touched. However, such a conventional input notifying process is a process for notifying after detecting that an operation was performed and it was difficult to say that it is definitely easy for a user to understand how to touch the panel for completing an input or the like.

More specifically, being different from a case of a physical button or a keyboard, there was a problem that it could not be comprehended whether or not an input is detected in a case when the panel is touched by how much degree of strength, whether or not the button is to be touched in a case when a boundary portion between the portion displayed as a button and its circumference is touched, or the like until the equipment is activated practically. Such a matter can be solved to a certain degree by being acclimated to the operation of the touch panel, but it is difficult to say that it is preferable for operating this sort of equipment, because habituation is necessary for the operational reliability.

Also, a conventional jog dial type input apparatus as shown in FIG. 1 needs an operation member arranged rotatably, so that there is a problem that parts for an input apparatus becomes comparatively large-scaled as compared with a case when push buttons or the like is simply arranged in the equipment. With respect to the operation member constituting the jog dial 4 of the example shown in FIG. 1, the portion which can be seen from the outside of the housing is only a partial portion of the member and it is practically a circular shaped component as shown by a dotted line such that relatively a large cubic capacity is expended for the disposing space of its component inside the equipment. Consequently, a case often happens where it is difficult to arrange the conventional jog dial type input apparatus for the reason of miniaturization of the equipment.

It should be noted that it was explained about an example applied to a portable telephone terminal with reference to the example of FIG. 1, but there is a similar problem also in case of other various electronic equipment on which a similar operation means (input means) is disposed.

A first object of the present invention is to propose an input method and an input apparatus in which operations using an input apparatus of a contact detecting type such as a touch panel can be carried out simply and certainly.

A second object of the present invention is to propose an input method and an input apparatus in which operationality is satisfactory such as a jog dial type input apparatus and at the same time a large installing space is not necessary.

DISCLOSURE OF THE INVENTION

An input method of a first invention is constituted so as to comprise a detection step for detecting an approach and a contact of a living body or material body in a predetermined detection region; a vibration step for making a vibration temporarily in response to a detection of the approach in aforesaid detection step; and an input step for performing a predetermined input process in response to a detection of the contact on a predetermined condition in aforesaid detection step. In this manner, in a case when, for example, a panel is approached by a finger of one hand, a pen or the like by making the face of the panel of a small-sized portable equipment as a detection region on a condition that the equipment is held by the other hand, the equipment vibrates temporarily by the detection of that approach such that the vibration is transmitted to the hand holding the equipment and it becomes possible for the user to comprehend that an input can be carried out by the contact to the position on the panel. Consequently, it will be comprehended caused by the temporary vibration that an input could be done by touching the position just before the face of the panel is touched, so that a secure operation of the touch panel becomes possible.

An input method of a second invention is constituted according to the input method of the first invention such that aforesaid vibration step performs a process for making a vibration temporarily also in response to a detection of the contact on a predetermined condition in aforesaid detection step. In this manner, it becomes possible to comprehend not only an approach but also a contact from the vibration.

An input method of a third invention is constituted according to the input method of the first invention such that aforesaid vibration step performs a process for making a vibration temporarily also in response to a detection of the contact on a predetermined condition in aforesaid detection step such that in aforesaid vibration step, a vibration condition in a case when the approach is detected is made different from a vibration condition in a case when the contact is detected. In this manner, it becomes possible by the vibration condition to distinguish a condition of approaching and a condition of contacting.

An input method of a fourth invention is constituted so as to comprise a detection step for detecting a contact position of a living body or material body in a predetermined detection region; an input step for accepting a specific input corresponding to a contact position or a change of a contact position which is detected in aforesaid detection step; and a vibration step for vibrating at least a vicinity of aforesaid detection region temporarily every time when a change of a predetermined amount or more occurs relating to the contact position in aforesaid detection step. In this manner, a specific input is accepted in response to a position or its position change which was detected by a sensor with respect to the contact of the living body or the material body, so that it becomes possible to accept an input by using a planar contact-detection sensor. Then, whenever a change of a predetermined amount or more exists for a position contacted by the sensor, a vibration corresponding to a click feeling is transmitted to a user contacting the sensor (or to a user through a material body contacting the sensor) by vibrating at least the vicinity of the detection region temporarily such that a similar feeling as in a case as if a dial having a click feeling is making rotated can be obtained and a satisfactory operationality can be obtained.

An input method of a fifth invention is constituted according to the input method of the fourth invention such that the contact detection in aforesaid detection step is detected according to strength change by a contact of a signal transmitted between one or a plurality of transmission electrodes disposed in aforesaid predetermined detection region and one or a plurality of receiving electrodes. In this manner, it is possible to carry out the detection of the contact position simply and certainly.

An input method of a sixth invention is constituted according to the input method of the fourth invention such that the contact detection in aforesaid detection step detects simultaneous contacts on a plurality of places according to strength change by a contact of a signal transmitted between one or a plurality of transmission electrodes disposed in aforesaid predetermined detection region and one or a plurality of receiving electrodes. In this manner, it becomes possible to detect a plurality of simultaneous contacts easily and satisfactorily.

An input method of a seventh invention is constituted according to the input method of the fourth invention such that the region for performing the contact detection in aforesaid detection step is made to be an annular region and the detection is performed according to strength change by a contact of a signal transmitted between one or a plurality of transmission electrodes disposed in the annular detection region and one or a plurality of receiving electrodes. In this manner, the detection region becomes of an endless constitution and restriction for the number of steps capable of the input instruction disappears.

An input method of an eighth invention is constituted according to the input method of the fourth invention such that the region for performing the contact detection in aforesaid detection step is made to be an annular region and an operation inside the region where aforesaid annular contact detection is performed is detected by another detection step than aforesaid detection step. In this manner, a high technical input process combining an operation of a contact detection sensor and an operation of a push button type switch becomes possible.

An input method of a ninth invention is constituted according to the input method of the fourth invention such that the region for performing the contact detection in aforesaid detection step is made to be an annular region; an operation inside the region where aforesaid annular contact detection is performed is detected by another detection step than aforesaid detection step; and a function for accepting an input in aforesaid input step is changed in response to a detection pattern in the two detection steps. In this manner, it becomes possible to be adaptable for the operations of various functions.

An input method of a tenth invention is constituted according to the input method of the fourth invention such that the contact detection in aforesaid detection step is detected according to strength change by a contact of a signal transmitted between one or a plurality of transmission electrodes disposed in aforesaid predetermined linear detection region and one or a plurality of receiving electrodes. In this manner, the input apparatus is to be constituted as a slider type one, so that it is possible to dispose the input apparatus satisfactorily in conformity with the shape of the equipment.

An input method of an eleventh invention is constituted according to the input method of the fourth invention such that the contact detection in aforesaid detection step is detected according to strength change by a contact of a signal transmitted between one or a plurality of transmission electrodes disposed in a detection region which is disposed linearly adjacent any one side of a display means performing a display of a character or a figure and one or a plurality of receiving electrodes. In this manner, it is possible to attain a satisfactory disposal combining with a display apparatus in one united body.

An input method of a twelfth invention is constituted according to the input method of the fourth invention such that the contact detection in aforesaid detection step is a process for detecting according to strength change by a contact of a signal transmitted between one or a plurality of transmission electrodes disposed in a detection region which is disposed linearly adjacent any one side of a display means performing a display of a character or a figure and one or a plurality of receiving electrodes; and an input of a function relating to the display in aforesaid display means is accepted by detecting the contact in the detection step. In this manner, the operation related to the display come to be performed satisfactorily.

An input method of a thirteenth invention is constituted according to the input method of the fourth invention such that the contact detection in aforesaid detection step is a process for detecting according to strength change by a contact of a signal transmitted between one or a plurality of transmission electrodes disposed in a detection region which is disposed linearly adjacent any one side of a display means performing a display of a character or a figure and one or a plurality of receiving electrodes and is a process for accepting an input of a function relating to the display in aforesaid display means by detecting the contact in the detection step; and an input of a function for changing magnification or reduction of the display in aforesaid display means to one or the other is accepted in a case when the contact positions of two places detected approximately simultaneously in aforesaid detection step change such as mutually approaching and in a case when they change such as being mutually apart. In this manner, the operation for the magnification or the reduction of the display comes to be performed very easily.

An input apparatus of a fourteenth invention is constituted so as to comprise a detection sensor for detecting an approach and a contact of a living body or a material body in a predetermined detection region; control means for outputting a drive signal in a case when an approach is detected by said detection sensor and performing an input process for accepting an input of a predetermined function in a case when a contact is detected on a predetermined condition; and an actuator responsive to an instruction from said control means for making a vibration temporarily. In this manner, in a case when, for example, a panel is approached by a finger of one hand, a pen or the like by making the face of the panel of a small-sized portable equipment as a detection region on a condition that the equipment is held by the other hand, the equipment vibrates temporarily by the detection of that approach such that the vibration is transmitted to the hand holding the equipment and it becomes possible for the user to comprehend that an input can be carried out by the contact to the position on the panel. Consequently, it will be comprehended caused by the temporary vibration that an input could be done by touching the position just before the face of the panel is touched, so that a secure operation of the touch panel becomes possible.

An input apparatus of a fifteenth invention is constituted according to the input apparatus of the fourteenth invention such that aforesaid control means performs a process for making a vibration temporarily in aforesaid actuator also in a case when a contact on a predetermined condition is detected in aforesaid detection sensor. In this manner, it becomes possible to comprehend not only an approach but also a contact from the vibration.

BRIEF DESCRIPTION OF DRAWINGS

FIG. 1 is an oblique perspective view showing one example of a portable telephone terminal provided with a conventional jog dial type input apparatus;

FIG. 3 is a cross sectional diagram showing an arrangement example inside equipment according to a first exemplified embodiment of the present invention;

FIG. 4 is an explanatory diagram showing one example of an approach and a contact detecting constitution according to a first exemplified embodiment of the present invention;

BEST MODE FOR CARRYING OUT THE INVENTION

Hereinafter, a first exemplified embodiment according to the present invention will be explained.

Figure 2:
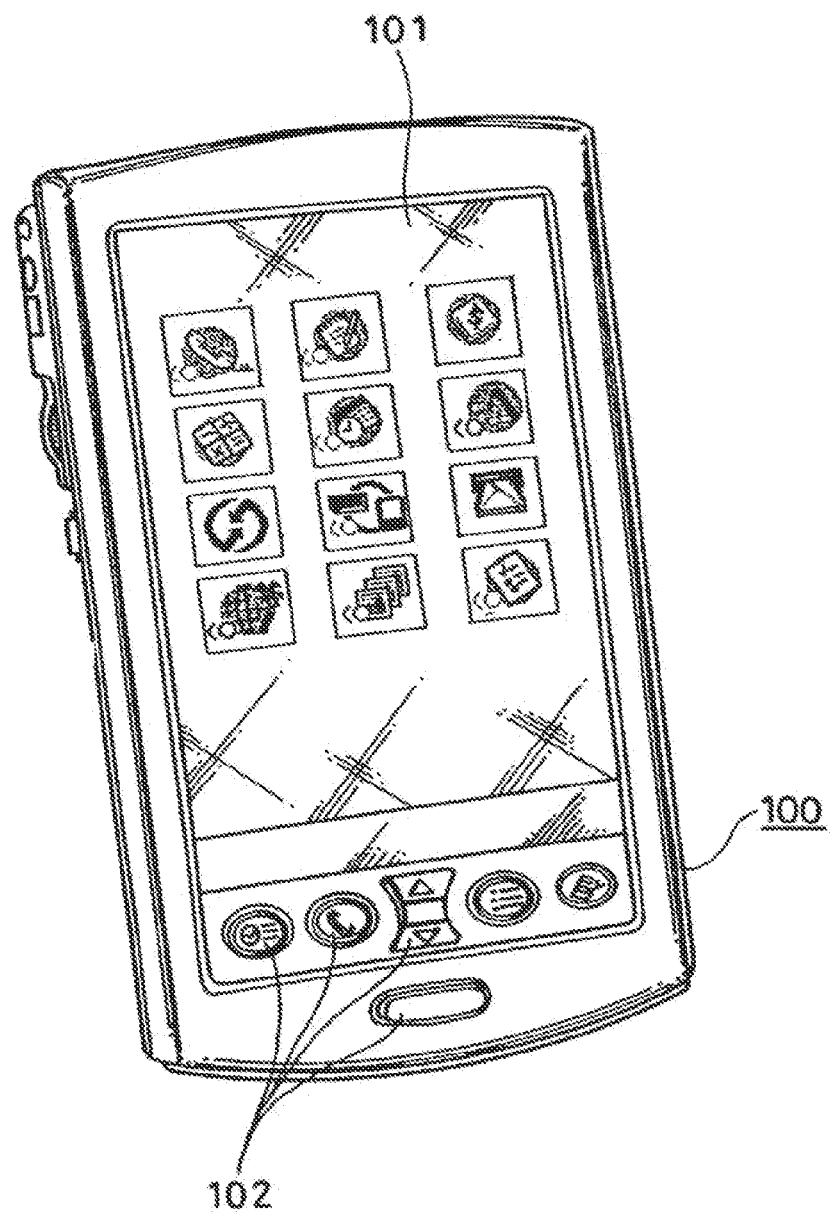
FIG. 2 is an oblique perspective view showing a constitutional example of equipment applied with an input apparatus according to a first exemplified embodiment of the present invention.

In this example, there is shown an input apparatus which is disposed on a face of a housing constituting electronic equipment so as to be operated by a user. FIG. 2 is an oblique perspective view showing an example in which the input apparatus according to this example is applied to a data processing terminal which is referred to as PDA and is constituted in a small size as a portable type. As shown in FIG. 2, PDA 100 of this example is mounted with a display panel 101 on the face. This display panel 101 is constituted, for example, by an LCD panel and it is possible to display various characters, figures and the like thereon. In addition, operation keys 102 are disposed at a lower edge portion of the face of the PDA 100.

Then, in this example, a sensor which can detect an approach and a contact of a finger or the like to the face of the display panel 101 is installed in the PDA 100. More specifically, for example, as shown in FIG. 3, a substrate 110 disposed with an electrode which functions as an approach and contact detecting sensor is disposed on the backside of the display panel 101 inside the PDA 100 it is constituted such that respective conditions can be detected in a case when a living body such as a finger approaches to the face of the display panel 101 and in a case when it is contacted therewith. In this case, it is constituted such that it is possible to detect which position of the display panel 101 is approached or contacted. A concrete constitutional example for detecting an approach and a contact will be described later on.

Also, as shown in FIG. 3, a vibrator 120 which functions as an actuator for transmitting a vibration to the housing constituting the PDA body is disposed inside the PDA 100 of this example and it is constituted such that the housing is vibrated temporarily according to the detected condition of the approach and the contact in the detection sensor.

FIG. 4 is a diagram showing a constitutional example of a sensor for detecting an approach and a contact according to this example by decomposing it. In case of this example, a plurality of electrodes 111 of a first group and a plurality of electrodes 112 of a second group are disposed alternately and linearly with an approximately fixed distance on the substrate 110 disposed on the backside of the display panel 101. Here, the electrode 111 of the first group is an electrode functioning as a transmission electrode and the electrode 112 of the second group is an electrode functioning as a receiving electrode. It should be noted that in order to make the explanation simple, the electrodes 111 and 112 are aligned only by one row in FIG. 4, but it is necessary to arrange a plurality of rows in a case when the region for detecting the approach and the contact is a broad area. For example, in a case when approximately the whole face of the display panel 101 is made to be the region for detecting the approach and the contact, it is necessary to make the substrate 110 have approximately the same area as that of the display panel 101 and to dispose the electrodes 111 and 112 by a predetermined pattern approximately on the whole face and on the downside of the display face of the display panel 101.

The capacitance value between the adjacent electrodes 111 and 112 changes in response to a condition that a finger approaches to the face and in accordance with capacitance coupling between the approached finger and the electrodes 111 and 112. In case of this example, the change of this capacitance value is measured electrically so as to detect the approach and the contact and at the same time also so as to detect its approach or contact position simultaneously. The detail of its detection process will be described later on. It should be noted that an approach in the example of the present invention means a condition where a finger or the like approaches, for example, within a range of several millimeters from the face of the display panel 101.

The electrodes 111 of the first group are supplied with a specific signal outputted from a signal source 11 in a time divisional manner through a change-over switch 12. The change-over switch 12 performs a process for switching each of the electrodes 111 sequentially in a comparatively short period so as to supply a signal to all the provided electrodes 111 from the signal source 11 in a time divisional manner and in a sequential order. In addition, it is constituted such that a change-over switch 13 which is switched in synchronism with the change-over switch 12 is provided and signals obtained at the electrodes 112 of the second group are supplied to an amplifier 14 in a time divisional manner and in a sequential order. The change-over switch 12 and the change-over switch 13 are constituted so as to be switched by the same period. For example, with respect to a timing in which the change-over switch 12 is changed over such that an electrode 111 of a certain position is supplied with a signal from the signal source 11, a signal obtained at an electrode 112 of the position adjacent to the electrode 111 to which the signal is supplied is selected by the change-over switch 13 and supplied to the amplifier 14.

The signal source 11 is a circuit for outputting a preset specific signal such as, for example, an AC signal having a specific frequency. The signal outputted from the signal source 11 is supplied to the plurality of transmission electrodes 111 sequentially through the change-over switch 12. In the amplifier 14 is connected to the electrodes 112 which are electrodes for receiving signals from respective transmission electrodes 111, supplied signals are amplified and thereafter supplied to a synchronous detector 15. The synchronous detector 15 is also supplied with an output signal of the signal source 11 so as to detect a signal component included in the output of the amplifier 14 in synchronism with the frequency of the output signal of the signal source 11. The detected signal component is supplied to a low pass filter 16 so as to be converted to a direct current and the direct current converted signal component is supplied to an analog/digital converter 17 so as to convert the signal receiving strength to digital data.

The data obtained in the analog/digital converter 17 are supplied to a controller 18 which performs a control of the input apparatus. The controller 18 judges the operation condition based on the supplied data and an instruction obtained according to the judgment of the operation condition is outputted from a terminal 20. In case of this example, the controller 18 judges a change of the signal strength based on the data supplied by means of the converter 17 and judges the condition in which the finger or the like approaches and contacts the display panel 101 based on the change of the signal strength.

Also, the controller 18 controls a pulse signal output of a pulse generator 19 according to the condition judged based on the data which is supplied from the converter 17 side. The pulse signal outputted from the pulse generator 19 is supplied to the vibrator 120 so as to vibrate the vibrator 120. As the pulse signal outputted from the pulse generator 19, for example, a pulse signal of about 20 Hz frequency is outputted in a short time such as one period. A member which vibrates by being applied with a signal, for example, such as a piezo vibrator is used for the vibrator 120 which is an actuator for vibration. The vibrator 120 vibrates temporarily only in a short time by supplying a pulse signal of such a short time to the vibrator 120 and the housing mounted with the vibrator 120 (namely, PDA 100 body) vibrates.

For example, two kinds of vibrations can be made set according to a case when a single-shot like vibration is made generated only one time by supplying a pulse signal of one period to the vibrator 120 only one time and according to a case when two consecutive vibrations are made generated by supplying a pulse signal of one period two times in succession with about 0.5 seconds apart to the vibrator 120.

Figure 5:
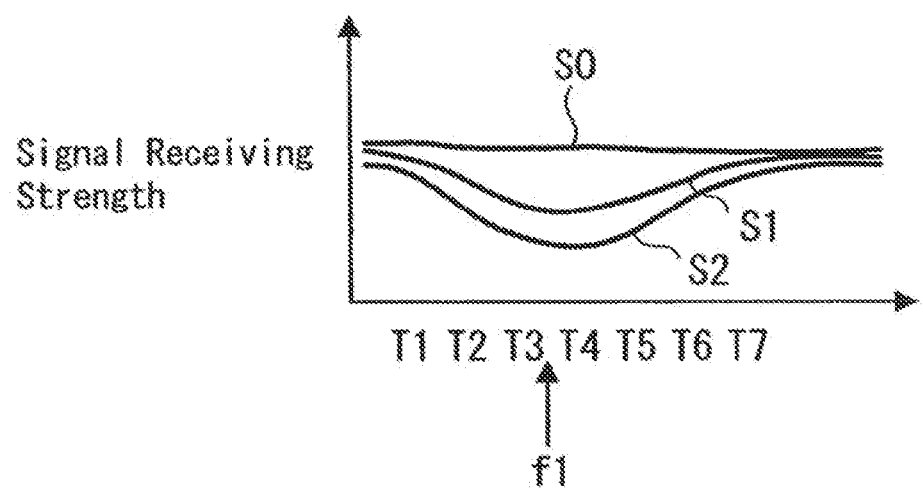
FIG. 5 is a characteristic diagram showing an example of a detection characteristic according to a first exemplified embodiment of the present invention.

Here, it is possible to make the controller 18 as a control means provided as an input apparatus alone and it is also possible to make the controller of the electronic equipment (here, PDA) installed with this input apparatus operate also for it. Next, the principle of detecting an approach and a contact of a finger and the like in the input apparatus of this example will be explained with reference to FIGS. 5 and 6. FIG. 5 shows a condition in which a specific position f1 on the display panel 101 in a right above portion disposed with the electrodes 111 and 112 is touched by one finger and the touched positions are designated as T1, T2, T3, T4, . . . . According to this example, it is in a condition that approximately an intermediate position f1 between a position T3 and a position T4 is touched by one finger. When touched in this way, the signal strength detected by the synchronous detector 15 through an electrode corresponding to a touched angular position becomes weaker than the signal strength detected synchronously through another electrode.

For example, supposing that the positions T1, T2, T3, T4, . . . corresponds to one by one of the positions of the electrodes 111 disposed by a fixed distance respectively, the receiving signal strength of the signal which is obtained by detecting the signal from the electrode 112 adjacent to the electrode 111 by the synchronous detector 15 at a timing when the signal from the signal source 11 is supplied to the electrode 111 of the position T1 becomes the signal strength of the position T1. In this manner, signal strengths of all positions on which electrodes 111 and 112 are disposed are measured and signal strengths between the positions on which the electrodes 111 and 112 are disposed are produced so as to in the controller 18 by an interpolation process such that on a condition that a finger or the like does not approach the display panel 101 at all, approximately a uniform signal strength is obtained at any angular position as shown as a characteristic S0 for a signal receiving strength on a usual condition in FIG. 5. On the other hand, for example, on a condition when one finger approaches approximately the intermediate position f1 between the position T3 and the position T4, a characteristic S1 is obtained as shown in FIG. 5 where the signal receiving strength at the approached position lowers as compared with that of other position. Further, on a condition when the approached finger touches the face of the display panel 101 at that position, a characteristic S2 is obtained as shown in FIG. 5 where the signal receiving strength at the approached position lowers moreover as compared with that of other position.

The lower of the signal receiving strength at the touched position occurs according to a capacitance coupling of the finger and the electrodes 111 and 112, so that the receiving strength lowers most at the position of the finger. The controller 18 judges the lowering of the receiving strength such that the position approached or touched by the finger is calculated in the controller 18. Further, the level difference between the receiving strength S1 obtained when the panel is approached and the receiving strength S2 obtained when the panel is touched is judged in the controller 18 such that it becomes possible to distinguish an approached condition and a contacted condition.

Figure 6:
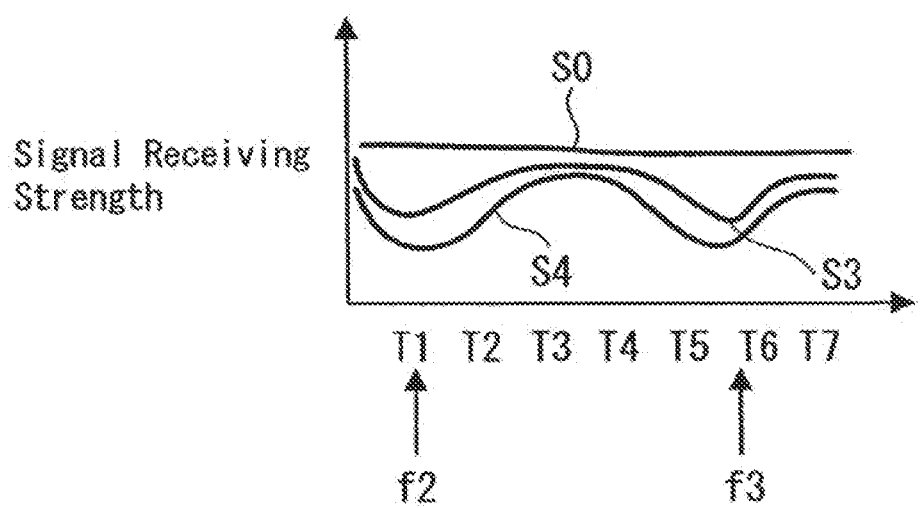
FIG. 6 is a characteristic diagram showing an example of a detection characteristic according to a first exemplified embodiment of the present invention.

It should be noted that the detection is possible even in a case when plural places on the panel are simultaneously touched or approached if the approach and contact detection of the constitution is done as shown in FIG. 4. In a case, for example, when one finger approaches a position f 2 in the vicinity of the position T1 and the other one finger approaches a position f 3 in the vicinity of the position T6, the signal receiving strength on this condition has a characteristic S3 as shown in FIG. 6 where the signal receiving strength has lowering peaks at two places of the position f 2 and the position f 3 as compared with approximately a flat signal receiving strength S0 in case of non-contact. Further, when the fingers contact the face of the panel at respective positions, a characteristic S4 is obtained where the signal receiving strength becomes lower. Consequently, positions approached or contacted by the two fingers are found in the controller 18 by calculating each of the peak positions. It is possible to detect according to a similar principle in a case when three places or more are approached or contacted simultaneously.

Figure 7:
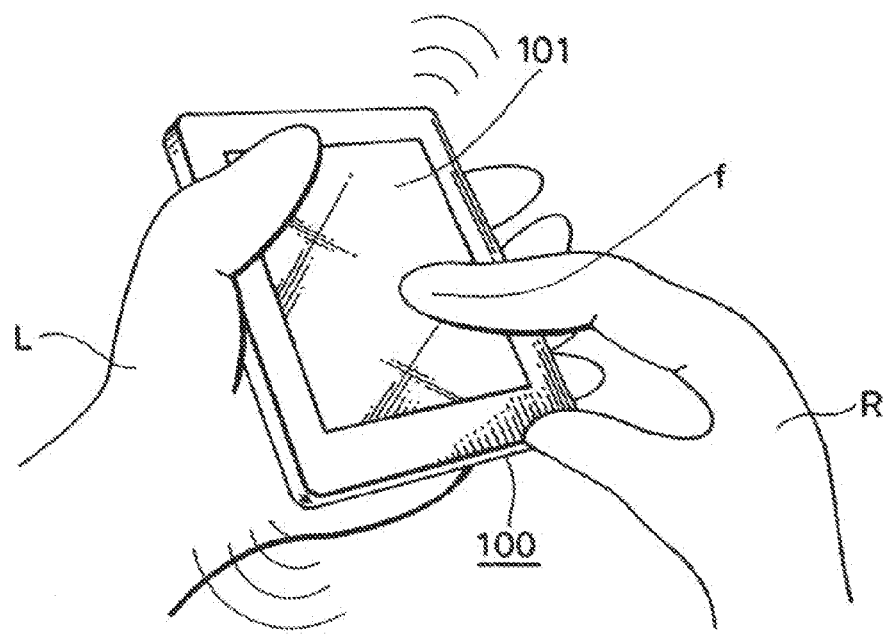
FIG. 7 is an explanatory diagram showing an operational example according to a first exemplified embodiment of the present invention.

In a case when the approach or the contact of the finger is detected in this way, it is constituted according to this invention such that the vibrator 120 is vibrated temporarily. More specifically, an operation example is shown in FIG. 7 as example and when a finger f of the right hand R is approached within several millimeters from the face of the display panel 101 on a condition that the PDA 100 is held by a left hand L of a user, the vibrator 120 in the PDA 100 vibrates temporarily and the temporary vibration is transmitted to the left hand L holding the PDA 100, so that it comes to be comprehended that an input can be carried out in case of touching that position. Further, in a case when the face of the display panel 101 at the approached position is touched, an input operation by means of a button and the like displayed at the position is carried out in response to that touch. In case of this touch, the vibrator 120 in the PDA 100 vibrates temporarily such that the touch can be comprehended and it comes to be comprehended that an input process was performed.

Figure 8:
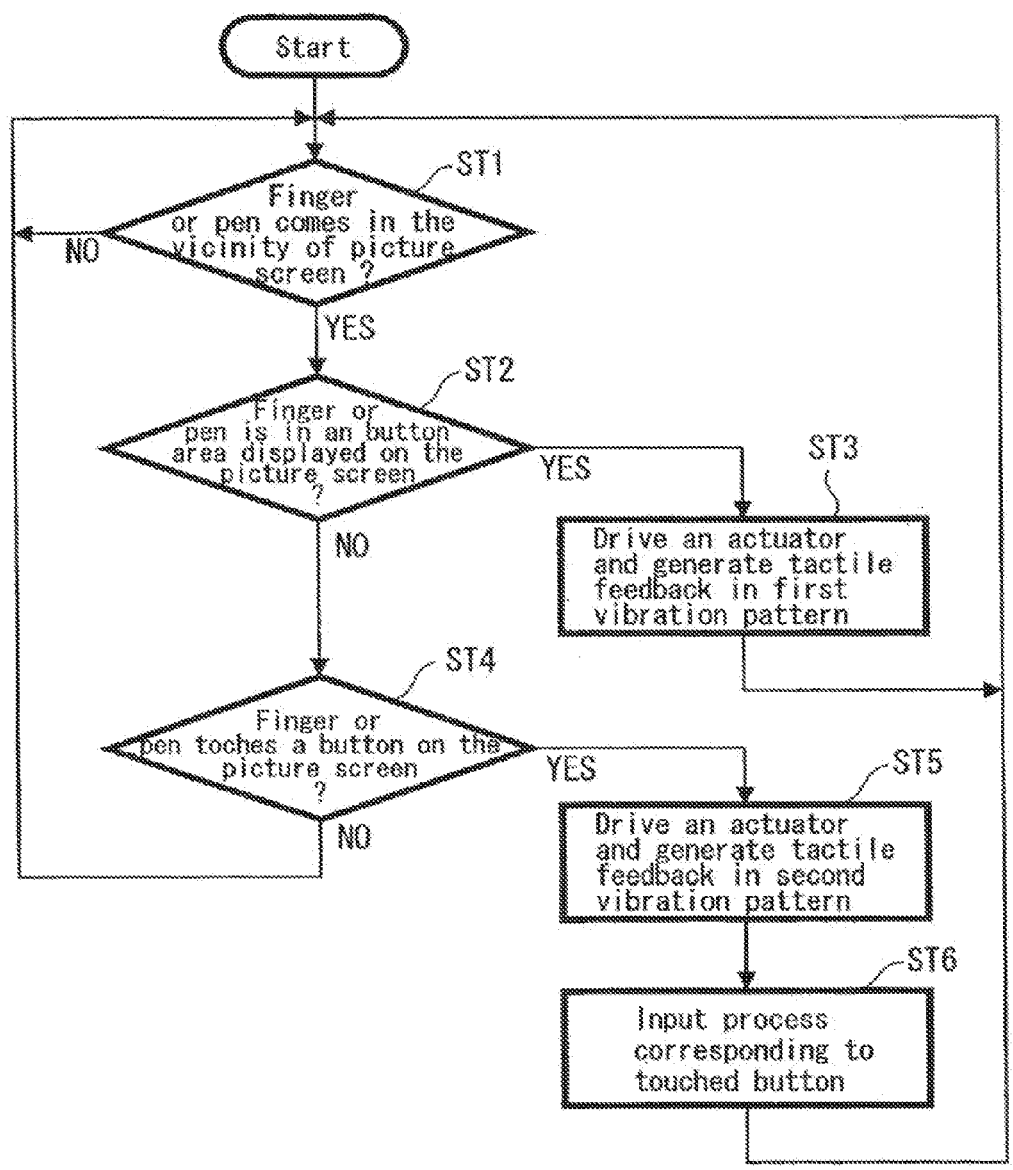
FIG. 8 is a flow chart showing an input process example according to a first exemplified embodiment of the present invention.

Next, a process performed in this way corresponding to the detection of an approach and a contact in the controller 18 will be explained with reference to a flow chart of FIG. 8. First, the controller 18 judges whether or not a finger (or an input pen such as described later on) approaches the display panel constituted as a detection sensor (step ST1). In a case when an approach is not detected, it stands by until an approach is detected. In a case when an approach is detected in step ST1, it is judged whether or not the position of the approached finger (or an input pen) is within an area of an operation button displayed on the panel (step ST2).

Here, in a case when it is judged that it approaches within the area of the operation button displayed, an instruction is transmitted to the pulse generator 19 so as to vibrate the actuator (vibrator 120) in a first vibration pattern and the vibrator 120 is vibrated temporarily such that a tactile feedback is performed onto the hand holding the equipment (step ST3). As for the first vibration pattern at this time, for example, a condition for vibrating only one time like a single-shot is made.

Also, in a case when it is judged in step ST2 that the finger on an approaching condition is not within the area of the button, the flow is shifted to step ST4 and it is judged whether or not the finger (or the input pen) came to be on a condition of contacting the button displayed on the screen. Here, in a case when it is judged that a contact is done, an instruction is transmitted to the pulse generator 19 so as to vibrate the actuator (vibrator 120) in a second vibration pattern and the vibrator 120 is vibrated temporarily such that a tactile feedback is performed onto the hand holding the equipment (step ST5). With respect to the second vibration pattern at this time, for example, the vibration is performed two times in succession so as to be distinguishable from the tactile feedback when approaching.

After tactile feedback is performed in step ST5 (or simultaneously), the controller 18 performs an input process corresponding to the touched button (step ST6). For example, in a case when a button for instructing a shift to a certain specific operation mode is touched, an instruction for shifting the operation mode of the equipment to an operation mode allotted to that button is outputted from the output terminal 20.

Then, after the processes of step ST3 and ST6 are performed and at the same time in a case when it is judged in step ST4 that the button on the screen is not touched the flow returns to the judgment in step ST1.

By performing a tactile feedback process for vibrating the equipment in this way based on the detection of the approach and the contact of a finger and the like, a user operating this equipment can comprehend by a tactile caused by a vibration whether or not the position on the panel to be touched by a finger is a position being operated for a contact, so that the operationality of the touch panel is advanced. For example, in a case when it is attempted to touch by a finger a vicinity of a boundary portion between an operation button displayed on the display panel and a portion which is not a button, it is comprehended whether or not the operation button was to be pushed down when the position is touched by a vibration when a finger approaches. More specifically, in a case when a tactile by means of a vibration exists, it can be comprehended that the operation button was pushed down when the position was touched and in a case when a tactile by means of a vibration does not exist, it becomes possible to push down the operation button correctively by slightly correcting the position to be touched by the finger.

Consequently, in a case when an operation cannot be performed caused by touching a vicinity of a boundary portion between an operation button and a portion which is not a button by a finger heretofore, an operation such as reattempting to push down the same button once again was necessary, but according to a case of this example, a position to be touched can be set relying upon a tactile, so that it is possible to make an operation certainly by touching once.

It should be noted that, the PDA 100 which was explained in connection with the first exemplified embodiment explained so far shows an example of equipment to be applied with an input apparatus according to the example of the present invention and it is needless to say that a similar input apparatus can be applied to various kinds of electronic equipment other than the PDA 100. In addition, the PDA 100 mentioned above was constituted so as to detect an approach and a contact to the face of the display panel, but it is possible to apply an input apparatus constituted so as to detect an approach and a contact to positions where a display means does not exist.

Also, in the example mentioned above, the vibrator 120 was vibrated temporarily in both cases when an approach was detected and when a contact was detected, but it is possible to employ a constitution where, for example, a vibration is made performed temporarily only in a case when an approach is detected while a vibration by the vibrator 120 is not performed in a case when a contact is detected. Alternatively, with respect to a vibration of the vibrator 120 by detecting a contact, it is possible to make it to vibrate temporarily in a case when the condition of being contacted continues to a certain degree or in a case when a predetermined amount of change is detected for the contact position. Also, it is possible to make it such that a user can select whether or not a vibration is to be made when detecting these approach and contact by setting an operation mode of the equipment. For example, it is possible to select a mode for vibrating temporarily only in a case when an approach is detected or a mode for vibrating temporarily in both cases when an approach and a contact are detected.

Further, in the circuit constitution of the input apparatus shown in FIG. 4 mentioned above, signals transmitted through respective electrodes in a time divisional manner are detected in such a way for applying the signals to respective electrodes in a time divisional manner, but it is possible to employ a constitute where signals transmitted through respective electrodes in other constitution or process are detected.

Also, in the examples explained so far, the input apparatus was to detect an approach and a contact of a finger which is a living body in restricted and a predetermined region of a display panel and the like, but it is possible to detect a contact of a material body such as an inputting pen other than a living body and to perform an input process based on the detection of that contact.

Figure 9:
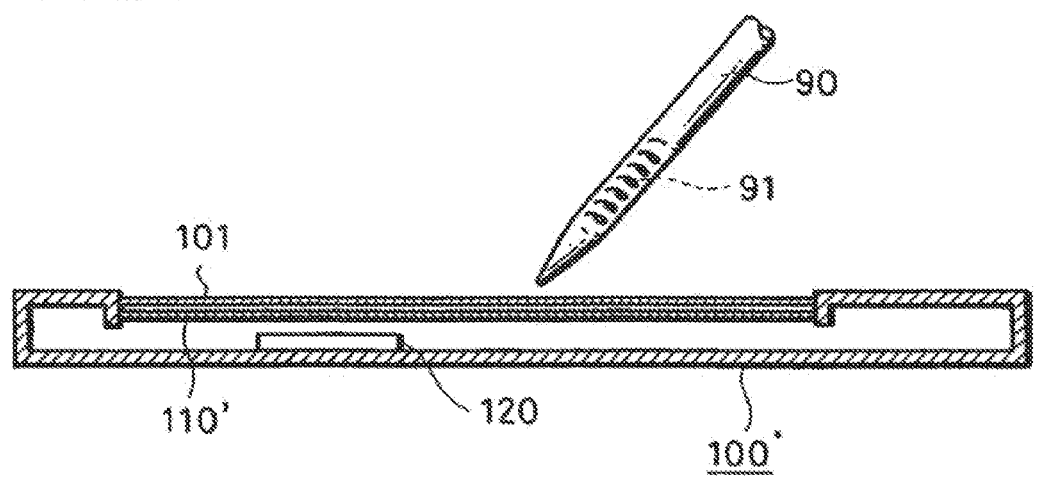
FIG. 9 is a cross sectional view showing a constitutional modified example (example of a pen input) according to a first exemplified embodiment of the present invention.

More specifically, as shown in FIG. 9, for example, it is possible to provide an input pen 90 installed with a coil 91 and the like inside its front edge portion and to use electrodes and the like disposed on a substrate 110' which is disposed on the backside of the display panel 101 of the PDA 100 so as to detect an approach and a contact of the front edge of the input pen 90. By doing like this, it becomes possible to detect a change of a magnetic field which is generated by an electromagnetic induction of the coil 91 caused by the front edge of the input pen 90 installed with the coil 91 approaching the display panel 101 and to detect the position of the pen approached.

Also, with respect to the constitution for performing an approach or a contact explained in connection with the first exemplified embodiment mentioned above, only one example was shown and it is possible to apply other constitutions.

Next, a second exemplified embodiment according to the present invention will be explained with reference to FIGS. 10 to 29.

Figure 10:
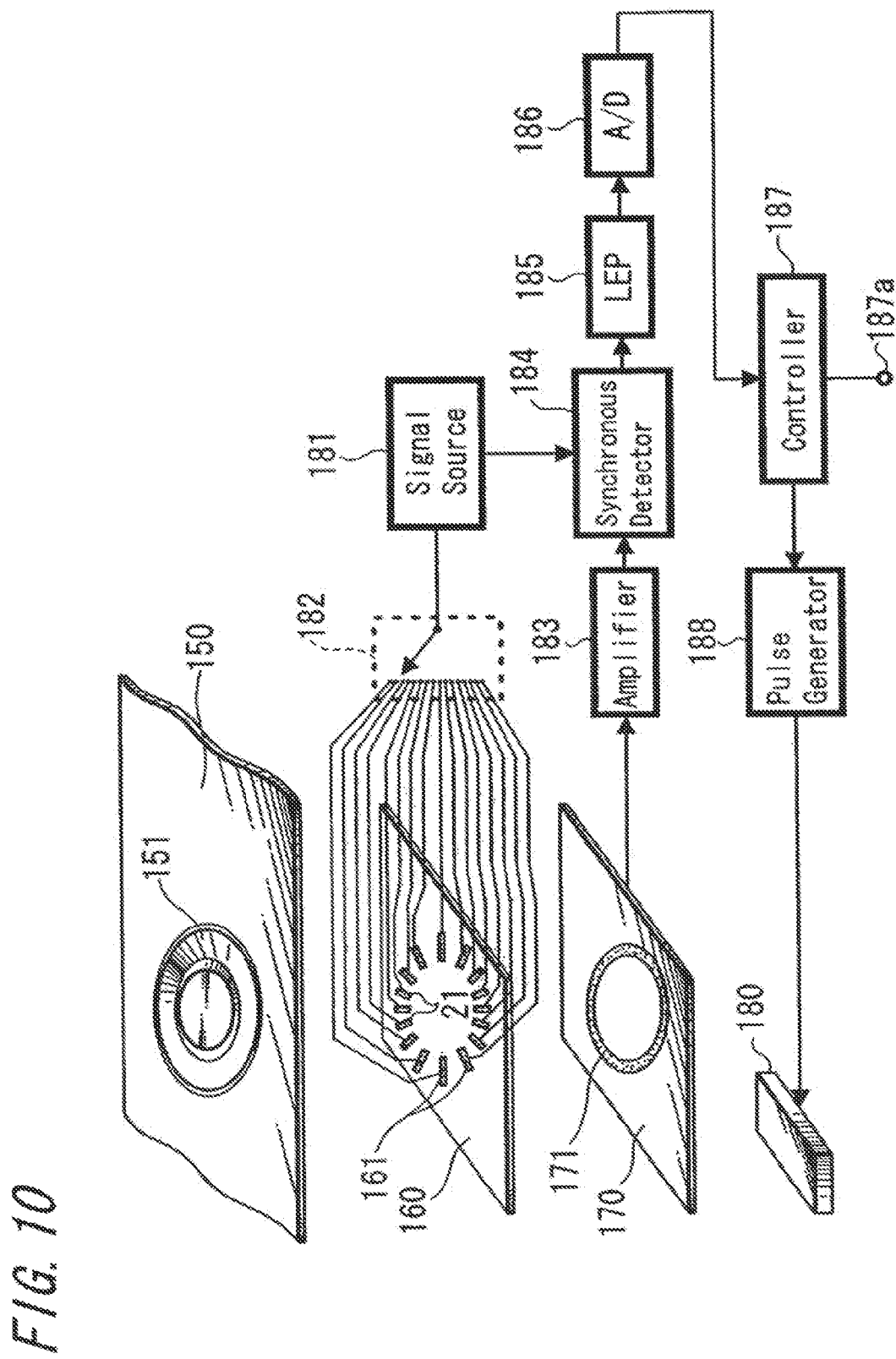
FIG. 10 is an explanatory diagram showing a constitutional example of an input apparatus (example 1 of a jog dial type) according to a second exemplified embodiment of the present invention.

According to this example, an input apparatus is constituted such that it is disposed on a face of a housing which constitutes electronic equipment and a user operates it. FIG. 10 a diagram showing one example in a case when the input apparatus of this example is constituted as a jog dial type input apparatus and parts such as a substrate are shown by exploded.

A portion where an input apparatus is constituted on the housing 150 of the equipment has a convex portion 151 formed as an annular circular-form. The annular convex portion 151 is formed by making the thickness of the resin constituting the housing 150 slightly thin such that the position formed with the convex portion 151 can be comprehended by a tactile when, for example, a user touches it by his finger. In case of this example, this annular convex portion 151 corresponds to an input portion to be operated when a user touches by a finger and the like. It should be noted here that the annular convex portion 151 is formed such that the operation position can be comprehended by a tactile and it is possible to make the operation position comprehended by other shapes such as a circular projection. Alternatively, it is possible to make the operation position comprehended by printings and the like without providing a convex portion or a convex portion as a shape on the face of the housing 150.

Two substrates 160 and 170 are disposed on the backside of the convex portion 151. Each of the substrates 160 and 170 is shown by being apart from the other in FIG. 10 for an explanatory purpose, but practically the two substrates 160 and 170 are disposed in a condition of being contacted closely on the backside of the convex portion 151. The material constituting each of the substrates 160 and 170 is made to be a comparatively thin material having an insulation characteristic.

Here, a plurality of electrodes 161 are disposed circularly and radially with approximately fixed distance on the face of the substrate 160 in conformity with the annular shape of the convex portion 151. One electrode 171 of a circular shape is disposed on the substrate 170 in conformity with annular shape of the convex portion 151. The electrodes 161 are used as transmission electrodes supplied with signals from a signal source 181 through a change-over switch 182. The electrode 171 is used as receiving electrodes for supplying signals obtained at the electrode to an amplifier 183 side.

It should be noted that an example is shown here where the electrodes 161 and 171 are disposed on the two substrates 160 and 170, but it is possible to dispose the two of the electrode 161 and the electrode 171 on the same substrate if it is on a condition of insulating each of the electrode 161 and the electrode 171. Alternatively, it is possible to dispose the electrode 161 on the face side of one substrate and to dispose the electrode 171 on the backside thereof. In either case, the distance between the electrode 161 and the electrode 171 is made to be a very adjacent distance such that a space between both the electrodes 161 and 171 is functioned as a capacitor and signals applied to the transmission electrode 161 are transmitted by means of the capacitance coupling between both the electrodes 161 and 171 to the receiving electrode 171 side. Here, the capacitance value between both the electrodes 161 and 171 changes when the face of the convex portion 151 is touched by a finger and the like according to a capacitance coupling which is produced between the finger and the electrodes 161 and 171 by that contact. In case of this example, the contact position is to be detected by measuring the change of this capacitance value electrically. The detail of the detection process will be described later on.

Then, according to this example, a vibrator 180 is mounted as an actuator for transmitting a vibration in the vicinity of a mounting position of the substrates 160 and 170 on the backside of a forming position of the convex portion 151 of the housing 150 and it is possible to vibrate the vicinity of the convex portion 151 by supplying a pulse signal from a pulse generator 188. As the vibrator 180, for example, a piezo vibrator, a coil or the like is used. It should be noted that it is not necessary to dispose the vibrator 180 necessarily on the backside of the forming position of the convex portion 151 if the vicinity of the forming position of the convex portion 151 can be vibrated temporarily by the vibration thereof.

Next, to explain about circuits connected to these electrodes 161 and 171 and to the vibrator 180, the signal source 181 is provided as shown in FIG. 10 and a specific signal such, for example, as an AC signal of a specific frequency is outputted from the signal source 181. The signal outputted from the signal source 181 is supplied sequentially to the plurality of electrodes 161 through the change-over switch 182. With respect to the electrodes 161, a lot of them are provided for every approximately certain angle position as already explained and the change-over switch 182 performs a process for switching the respective electrodes 161 sequentially in a comparatively short period such that all of the provided electrodes 161 are supplied with the signal from the signal source 181 in a time divisional manner and in a sequential order.

Then, the electrode 171 which is an electrode for receiving signals from respective transmission electrodes 161 is connected with the amplifier 183 and the signal received by the electrode 171 is amplified by means of the amplifier 183 and thereafter supplied to a synchronous detector 184. The synchronous detector 184 is supplied also with an output signal of the signal source 181 and detects a signal component included in the output of the amplifier 183 and being in synchronism with the output signal frequency of the signal source 181. The detected signal component is supplied to a low pass filter 185 so as to be made to be a direct current and the direct current made signal component is supplied to an analog/digital converter 186 so as to make the signal receiving strength to be digital data.

The data obtained in the analog/digital converter 186 is supplied to a controller 187 which performs a control of the input apparatus. The controller 187 judges the operation condition based on the supplied data and outputs an instruction obtained based on the judgment of the operation condition from a terminal 187a. In case of this example, the controller 187 judges a change of a signal strength based on the data supplied by means of the converter 186 and judges an operation condition of the convex portion 151 according to the change of the signal strength.

Also, the controller 187 controls the output of the pulse signal from the pulse generator 188 according to the operation condition of the convex portion 151 which was judged based on the data supplied from the converter 186 side. With respect to the pulse signal outputted from the pulse generator 188, a pulse signal having a frequency, for example, of about 20 Hz is outputted only for one period. Here, the controller 187 performs a control for outputting a pulse signal to make the vibrator 180 vibrate temporarily every time when it detects that the position touching the annular shaped convex portion 151 changes as much as a certain angle (for example, every 30°). It should be noted that the controller 187 can be a control means provided as an input apparatus alone, but it is possible to use the controller of the electronic equipment on which this input apparatus is installed also for that purpose.

Figure 11:
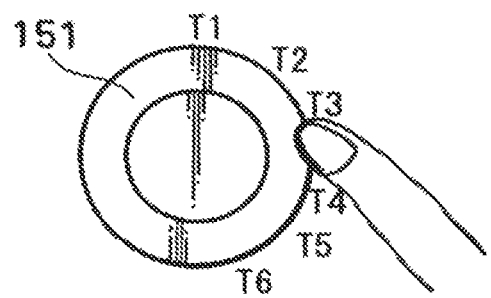
FIG. 11 is an explanatory diagram showing a condition of touching an input apparatus according to a second exemplified embodiment of the present invention.

Next, the principle of detecting a condition touched to the convex portion 151 in the input apparatus according to this example will be explained with reference to FIGS. 11 to 14. FIG. 11 shows a condition in which a position being formed with the convex portion 151 is touched by one finger and the touched angular position is shown as T1, T2, T3, T4, . . . . In this example, it is on a condition that approximately an intermediate position f 4 between the position T3 and the position T4 is touched by one finger. When touched in this manner, the signal strength detected by the synchronous detector 184 through the electrode corresponding to the touched angular position becomes weak as compared with the signal strengths detected synchronously through other electrodes.

For example, assuming that the angular positions T1, T2, T3, T4, . . . correspond to angular positions of the electrodes 161 one by one which are disposed by a fixed distance, the receiving signal strength of the signal detected by the synchronous detector 184 becomes the signal strength of the angular position T1 at the timing when the signal from the signal source 181 is supplied to the electrode 161 of the position T1. In this manner, by measuring signal strengths of all angular positions disposed with the electrodes 161 so as to produce signal strengths among the angular positions disposed with the electrodes 161 according to an interpolation process in the controller 187, approximately a uniform signal strength is obtained at any angular position on a condition that a finger or the like does not touch the convex portion 151 at all as shown in FIG. 12 as a characteristic S0 of a signal receiving strength on a usual condition.

Figure 12:
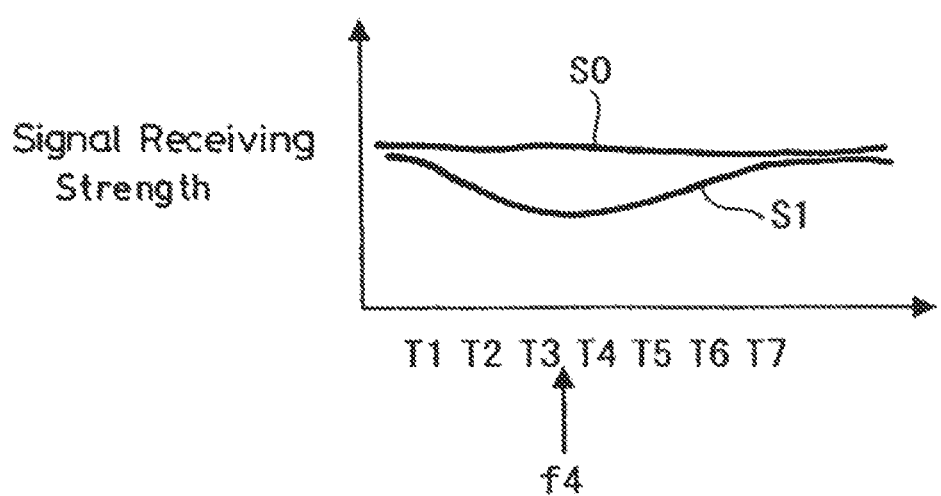
FIG. 12 is an explanatory diagram showing an output characteristic example on a condition of being touched as shown in FIG. 11.

On the other hand, on a condition that approximately an intermediate position f 4 between the position T3 and the position T4 is touched by one finger as shown in FIG. 11, a characteristic S1 as shown in FIG. 12 is obtained where the signal receiving strength at the touched angular position is made lowered compared with those of other positions.

The lowering of the signal receiving strength at the touched position is produced by the capacitance coupling between the touched finger and the electrodes 161 and 171, and the receiving strength is most lowered at an angular position touched by the finger. The controller 187 judges the lowering of the receiving strength such that the angular position touched by the finger is calculated in the controller 187.

Figure 13:
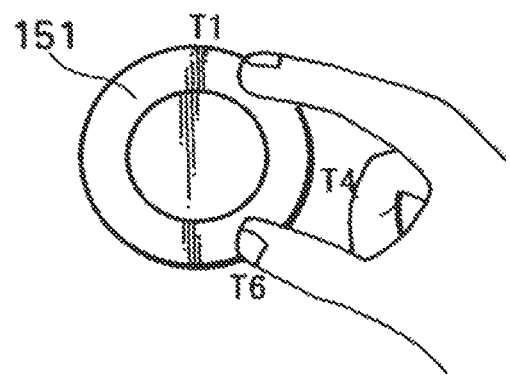
FIG. 13 is an explanatory diagram showing a condition of touching an input apparatus at two places simultaneously according to a second exemplified embodiment of the present invention.
Figure 14:
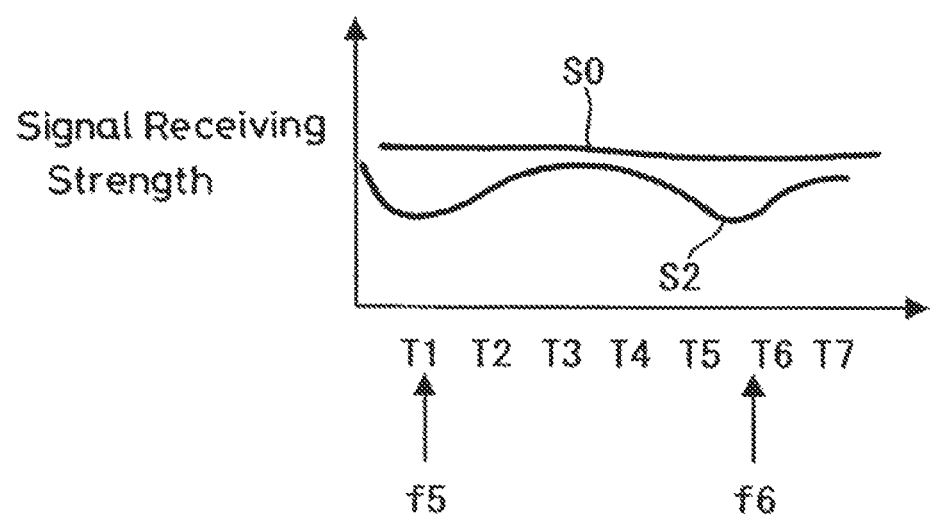
FIG. 14 is an explanatory diagram showing an output characteristic example on a condition of being touched as shown in FIG. 13.

In the example of FIGS. 11 and 12 only an example where only one place of the convex portion 151 is touched was explained, but it is possible for the contact position detection according to the principle of this example to detect the contact even if it happens that a plurality of places of the convex portion 151 are to be touched simultaneously. For example, when a position f 5 in the vicinity of the angular position T1 is touched by one finger and a position f 6 in the vicinity of the angular position T6 is touched by another finger as shown in FIG. 13, the signal receiving strength on this condition comes to have a characteristic S2 as shown in FIG. 14 where lowered peaks of the signal receiving strengths are obtained at two places in the vicinity of the angular position T1 and in the vicinity of the angular position T6 as compared with approximately a flat signal receiving strength S0 of non-contacting case. Consequently, angular positions touched by the two fingers are found in the controller 187 by calculating each peak position. It is possible to detect in a case when three or more places are contacted simultaneous according to a similar principle.

Figure 15:
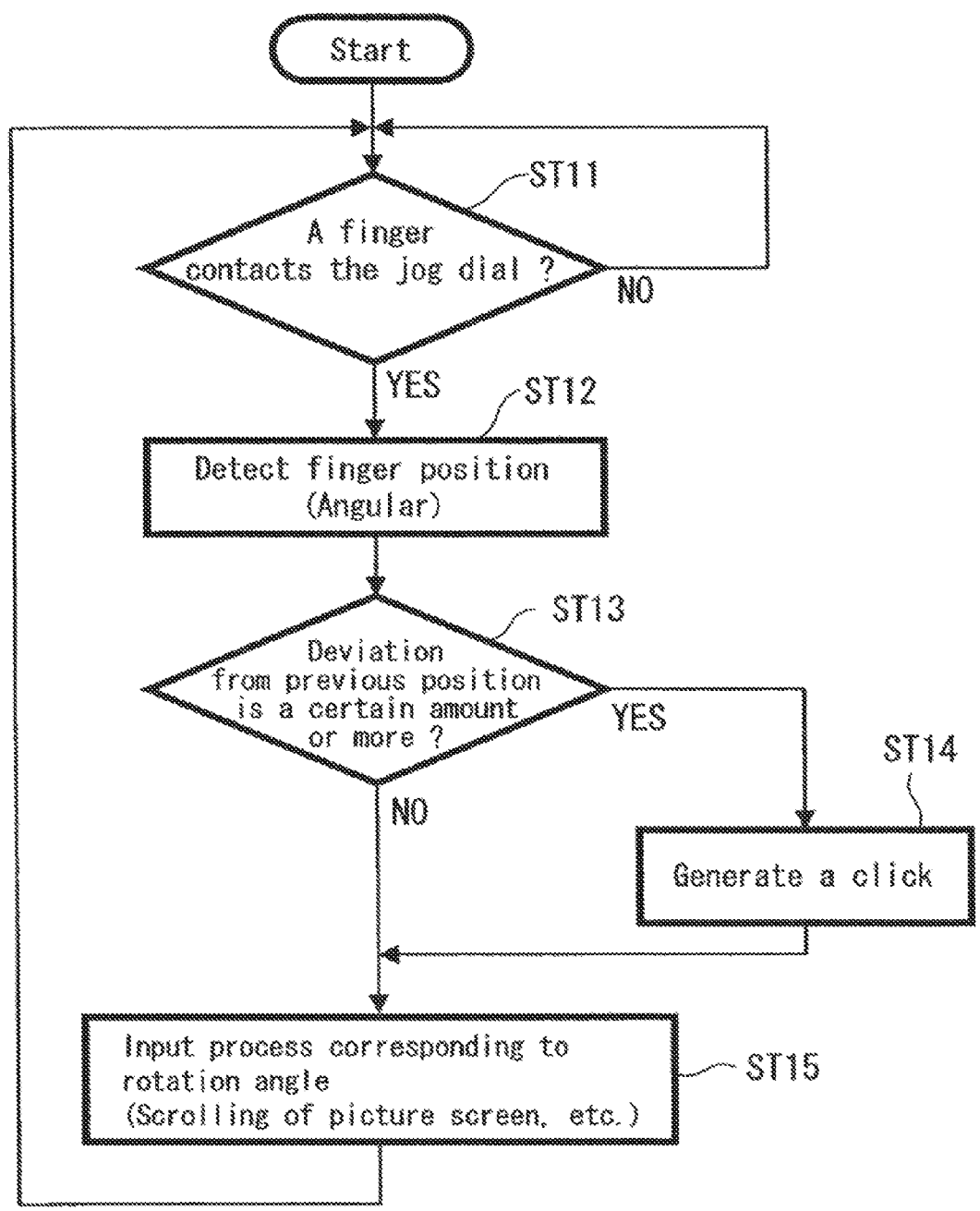
FIG. 15 is a flow chart showing a process example based on an input detection according to a second exemplified embodiment of the present invention.

Next, a process performed for detecting a contact position of the convex portion 151 in this way in the controller 187 will be explained with reference to a flow chart of FIG. 15. First, the controller 187 judges whether or not it is detected that a finger contacts the convex portion 151 corresponding to the jog dial (step ST11). In a case when a contact is not detected, it stands by until a contact is detected. Then, in a case when a contact is detected, a contact position (here, an angular position) of the finger when its contact was detected is detected (step ST12). Here, it is judged whether or not a change of a certain amount (here, a certain amount of angle) or more occurred as compared with a contact position detected previously (step ST13) and in a case when a change of a certain amount or more occurred, a generation process of a click is performed (step ST14).

The generation process of a click here is a process for transmitting a pulse generation instruction from a controller 47 to the pulse generator 188 and for making the vibrator 180 vibrate temporarily by supplying a single-shot like pulse signal from the pulse generator 188 to the vibrator 180 such that a temporary vibration is transmitted to the finger touching the convex portion 151.

Then, in a case when after a click generating process is performed in step ST14 and a change of a certain amount or more was not detected in step ST13, the flow shifts to step ST15 and the controller 187 outputs an instruction for performing an input process corresponding to a rotational direction and a rotation amount of the contact position at that time from the terminal 187a. For example, in a case when a scroll of the display screen in the display apparatus is set to be performed in response to a contact operation to the convex portion 151 corresponding to a jog dial and when a rotation of the contact position is detected by approximately 180° in a clockwise direction, the picture screen is made scrolled in one direction to the position corresponding to that 180°. Also, when a rotation of the contact position by approximately 90° in a counterclockwise direction is detected, the picture screen is made scrolled in the other direction as much as a position corresponding to that 90°. After the input process is performed in this way, the flow returns to a contact detection of step ST11.

In this manner, it is possible to constitute an input apparatus corresponding to a conventional jog dial without using a movable member such as a rotational knob at all. In this case, it is constituted such that a vibration corresponding to a click feeling is to be transmitted to a finger touched by temporarily vibrating the vibrator 180 every time when an angle touched by the finger changes by a certain angle or more, so that similar operation sensitivity is obtained as when a jog dial having a click feeling is operated and satisfactory operationality can be secured. It should be noted that an input process is performed in response to the rotation detection of the contact position in a process example according to the flow chart of FIG. 15, but in a case when a temporary or continuous contact without being accompanied by a rotation is detected, it is also possible to perform an input process corresponding to each detection.

Also, the disposition example of the transmission electrode and the receiving electrode shown in FIG. 10 is merely shown as one example and it is possible to detect contact positions by other electrode disposition. According to a constitution shown in FIG. 16, in a case when a plurality of electrodes are disposed radially on a substrate 190 disposed on a backside of the annular convex portion 151, electrodes 191a of a first group and electrodes 191b of a second group are divided one by one and alternately. The electrode 191a of the first group is supplied with a signal in a time divisional manner from the signal source 181 through a change-over switch 182a. Also, it is constituted such that a change-over switch 182b which is switched in cooperation with the change-over switch 182*a* is provided and the signals obtained in the electrodes 191*b* of the second group are supplied to the amplifier 183 in a time divisional manner.

The constitution for processing the output of the amplifier 183 is made to be same as the constitution shown in FIG. 10. More specifically, an output of the amplifier 183 is supplied to the synchronous detector 184 so as to perform a detection in synchronism with the output of the signal source 181, the detected signal is passed through the low pass filter 185, thereafter made to be data in the analog/digital converter 186, and the converted data are judged in the controller 187. Also, a control of a pulse supplied from the pulse generator 188 to the vibrator 180 is carried out based on the judged condition of the controller 187 and a vibration corresponding to a click feeling is generated.

Figure 16:
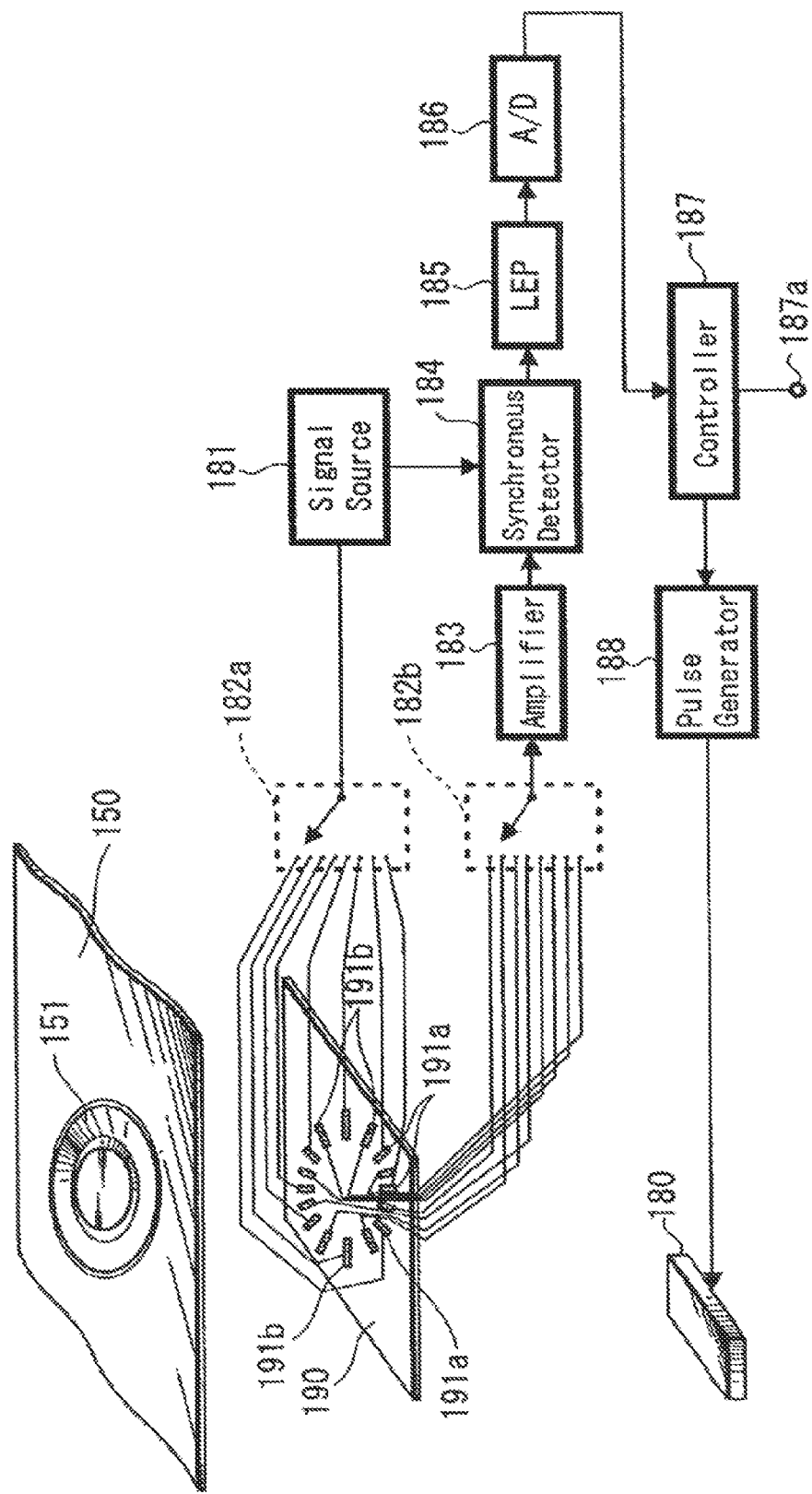
FIG. 16 is an explanatory diagram showing a constitutional example of an input apparatus (example 2 of a jog dial type) according to a second exemplified embodiment of the present invention.

In case of employing the constitution as shown in FIG. 16, when there is no contact of a finger or the like on the annular convex portion 151 at all, capacitances formed between electrodes 191*a* of the first group and adjacent electrodes 191*b* of second group become approximately equal at any position, so that the signal receiving strengths detected by the controller 187 become approximately constant. On the other hand, in a case when a finger or the like contacts any one of the positions of the annular convex portion 151, the capacitance formed between an electrode 191*a* of the first group and an electrode 191*b* of the second group which are positioned at the back portion of that contact position changes in response to a capacitance coupling between the contacted finger and both the electrodes 191*a* and 191*b*, so that the lowering in the signal receiving strength at that position is detected by the controller 47. Consequently, similar characteristics as the examples shown in FIGS. 11 to 14 are obtained as characteristics caused by a contact of a finger or the like and it becomes possible that a contact position by a finger or the like is to be detected in the controller 47. It is needless to say that simultaneous contacts at a plurality of positions as shown in FIG. 13 can be detected.

Figure 17:
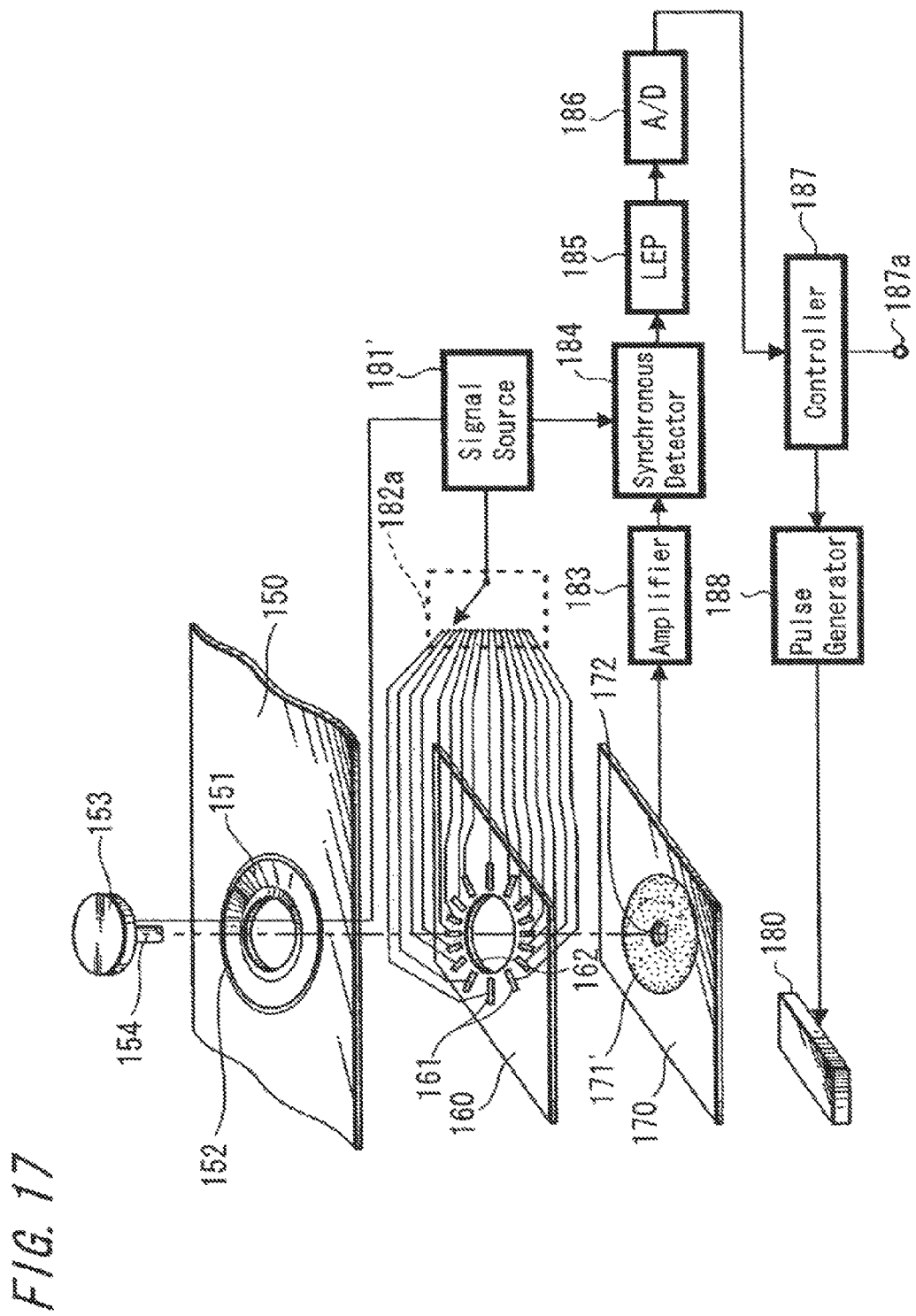
FIG. 17 is an explanatory diagram showing a constitutional example of an input apparatus (example where a push button is combined) according to a second exemplified embodiment of the present invention.

Also, it is possible to combine the input apparatus according to the example of the present invention with other operation means such as a push button type switch. An example shown in FIG. 17 is an example where the input apparatus according to the example of the present invention and a push button type switch are combined. According to this example, an opening 152 is formed at the center of the annular convex portion 151 as shown in FIG. 17 and a button 153 of a circular form or the like is to be engaged into the opening 152 so as to be constituted as a switch which performs an input by the pushing down of the button 153. In this case, openings 162 and 172 are provided at the center of the substrates 160 and 170 respectively such that an axis 154 of the button 153 is to be retained on a condition that it is inserted through the openings 162 and 172 of the substrates 160 and 170. In this case, button 153 is constituted such that it is retained on a condition of slightly pushed up by means of a spring or the like. Also, a receiving electrode 171' on the substrate 170 is constituted as an electrode portion having an area enlarged until near the center such that an electrode (not shown) of the button 153 side and the electrode 171' contact each other when the button 153 is pushed down.

Then, the signal is to be supplied from the signal source 181' also to the bottom face side of the button 153 and it is constituted such that when the button 153 inserted through the opening 152 of the housing 150 is operated (that is, pushed down), the signal supplied from the signal source 181' is to be transmitted to the electrode 171' on the substrate 170. By doing like this, when the button 153 is operated, signals received by the electrode 171' is processed in the receiving system circuits succeeding to the amplifier 183 and signals corresponding to the condition of the button 153 pushed down are detected in the controller 187. The signal supplied from the signal source 181' to the button 153 side and the signal supplied from the signal source 181' to each of the transmission electrodes 161 are made distinguished on the controller 187 side, for example, as different signals. Alternatively, with respect to signals supplied to the button 153 side, it is possible to make them to be transmitted by way of the change-over switch 182 so as to supply them thereto in a time divisional manner together with each of the transmission electrodes 161. It should be noted that the vibrator 180 is not vibrated during the operation detection period of the button 153.

By constituting like this, it happens that the operation means by means of the convex portion 151 and the operation means by means of the push button 153 are to be combined such that it becomes possible to perform an operation instruction more high-technically. Details of a more specific operational example in case of employing such a constitution will be described later on as an example combined with actual equipment. It should be noted also with respect to a push button type switch disposed at the center the annular convex portion 151 that it is possible to employ a switch using a contact detection sensor which can operate only by being touched with a finger or the like.

Also, the examples explained so far were related to examples constituted as a jog dial type input apparatus which is constituted by a circular convex portion or the like, but it is possible to constitute as another shaped input apparatus to which a contact detection processing constitution according to this invention is applied. For example, as shown in FIG. 18, it is possible to constitute it as a slider type input apparatus having a contact detection portion elongated linearly.

Figure 18:
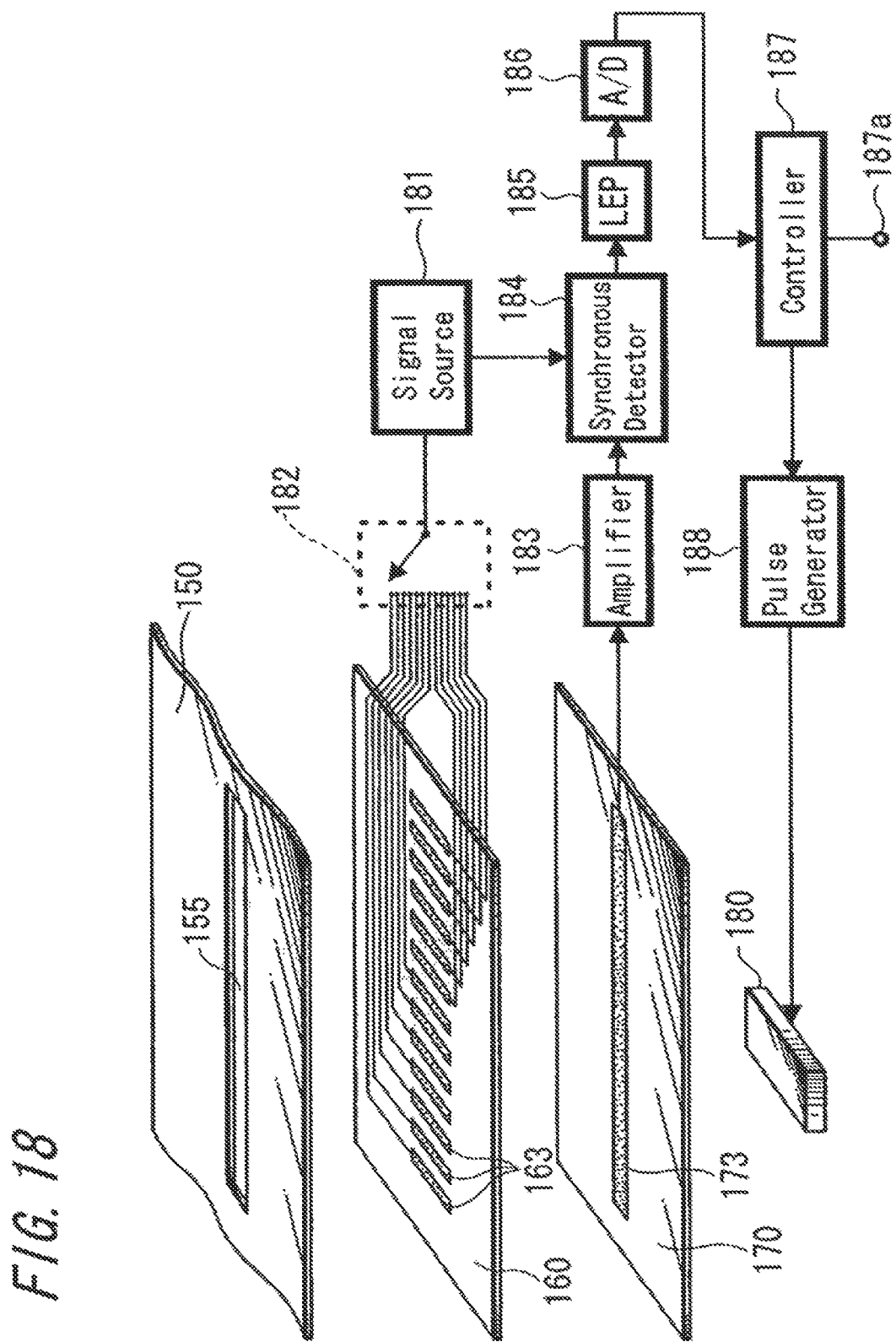
FIG. 18 is an explanatory diagram showing a constitutional example of an input apparatus (example 1 of a slider type) according to a second exemplified embodiment of the present invention.

In the example shown in FIG. 18, it is constituted such that a linear convex portion 155 is formed on the face of the housing 150 and contacting this linear convex portion 155 by a finger or the like can be detected. The linear convex portion 155 is formed by a process for making the thickness of the resin constituting the housing 150 slightly thin or the like such that the position formed with the convex portion 155 can be comprehended by a tactile when, for example, a user touched it with his finger. It should be noted that it is possible to comprehend the linear operation position by a shape other than a convex portion or by a printing.

Two substrates 160 and 170 are disposed on the backside of the convex portion 155. Each of the substrates 160 and 170 is shown by being apart from the other in FIG. 18 for an explanatory purpose, but practically the two substrates 160 and 170 are disposed in a condition of being contacted closely on the backside of the convex portion 155. The material constituting each of the substrates 160 and 170 is made to be a comparatively thin material having an insulation characteristic.

Here, a plurality of electrodes 163 which are aligned linearly with approximately fixed distance in conformity with the linear shape of the convex portion 155 are disposed on the face of the substrate 160. One electrode 173 of a linear shape is disposed on the substrate 170 in conformity with the shape of the convex portion 151. The electrodes 163 are used as transmission electrodes supplied with signals from a signal source 181 through a change-over switch 182. The electrode 173 is used as receiving electrodes for supplying signals obtained at the electrode to an amplifier 183 side.

It should be noted also in this example of FIG. 18 that an example is shown similarly as the example of FIG. 10 or the like already explained where the electrodes 163 and 173 are disposed on the two substrates 160 and 170, but it is possible to dispose the two of the electrode 163 and the electrode 173 on the same substrate if it is on a condition of insulating each of the electrode 163 and the electrode 173. Alternatively, it is possible to dispose the electrode 161 on the face side of one substrate and to dispose the electrode 171 on the backside thereof. In either case, the distance between the electrode 163 and the electrode 173 is made to be a very adjacent distance such that a space between both the electrodes 163 and 173 is functioned as a capacitor and signals applied to the transmission electrode 163 are transmitted by means of the capacitance coupling between both the electrodes 163 and 173 to the receiving electrode 173 side. Here, the capacitance value between both the electrodes 163 and 173 changes when the face of the convex portion 155 is touched by a finger and the like according to a capacitance coupling which is produced between the finger and the electrodes 163 and 173 by that contact. In case of this example, the contact position is to be detected by measuring the change of this capacitance value electrically.

Then, according to this example, a vibrator 180 is mounted in the vicinity of a mounting position of the substrates 160 and 170 on the backside of a forming position of the convex portion 155 of the housing 150 and it is possible to vibrate the vicinity of the convex portion 155 by supplying a pulse signal from a pulse generator 188. As the vibrator 180, for example, a piezo vibrator, a coil or the like is used. It should be noted that it is not necessary to dispose the vibrator 180 necessarily on the backside of the forming position of the convex portion 155 if the vicinity of the forming position of the convex portion 155 can be vibrated temporarily by the vibration thereof.

With respect to the circuits connected to these electrodes 163 and 173 and the vibrator 180 have the same constitutions as those already explained in FIG. 10 or the like. More specifically, the signal source 181 is provided and a specific signal such, for example, as an AC signal of a specific frequency is outputted from the signal source 181. The signal outputted from the signal source 181 is supplied sequentially to the plurality of electrodes 163 through the change-over switch 182. With respect to the electrodes 163, a lot of them are provided for every approximately certain distance and the change-over switch 182 performs a process for switching the respective electrodes 163 sequentially in a comparatively short period such that all of the provided electrodes 163 are to be supplied with the signal from the signal source 181 in a time divisional manner and in a sequential order.

Then, the electrode 173 which is an electrode for receiving signals from respective transmission electrodes 163 is connected with the amplifier 183, the output of this amplifier 183 is detected by the synchronous detector 184, the detected output is supplied to a low pass filter 185 so as to be made to be a direct current, and the filtered output is supplied to an analog/digital converter 186 so as to make the signal receiving strength to be digital data.

The data obtained in the analog/digital converter 186 is supplied to a controller 187 which performs a control of the input apparatus. The controller 187 judges the operation condition based on the supplied data and outputs an instruction obtained based on the judgment of the operation condition from a terminal 187a. In case of this example, the controller 187 judges a change of a signal strength based on the data supplied by means of the converter 186 and judges an operation condition of the convex portion 155 according to the change of the signal strength.

Also, the controller 187 controls the output of the pulse signal from the pulse generator 188 according to the operation condition of the convex portion 155 which was judged based on the data supplied from the converter 186 side. Here, the controller 187 performs a control for outputting a pulse signal to make the vibrator 180 vibrate temporarily every time when it detects that the position touching the linear shaped convex portion 155 changes as much as a certain distance (for example, every 1 cm).

With respect to the principle for detecting the condition of touching the convex portion 155 in the input apparatus of the constitution in FIG. 18, it is completely similar to the principle for detecting the condition of touching the annular convex portion 151 shown in FIG. 10 or the like such that a change of the signal receiving strength cooperated with the change of the capacitance caused by the contact of a finger or the like is detected so as to detect the contact position. It is possible to detect the contact position according to the principle shown in FIGS. 13 and 14 in a case when a plurality of positions are touched simultaneously. Then, the controller 187 performs an input process in response to the variation of the detected position or the like. Also, the vibrator 180 vibrates temporarily every time when the change of the contact position becomes a predetermined distance such that a vibration corresponding to a click feeling is transmitted.

Figure 19:
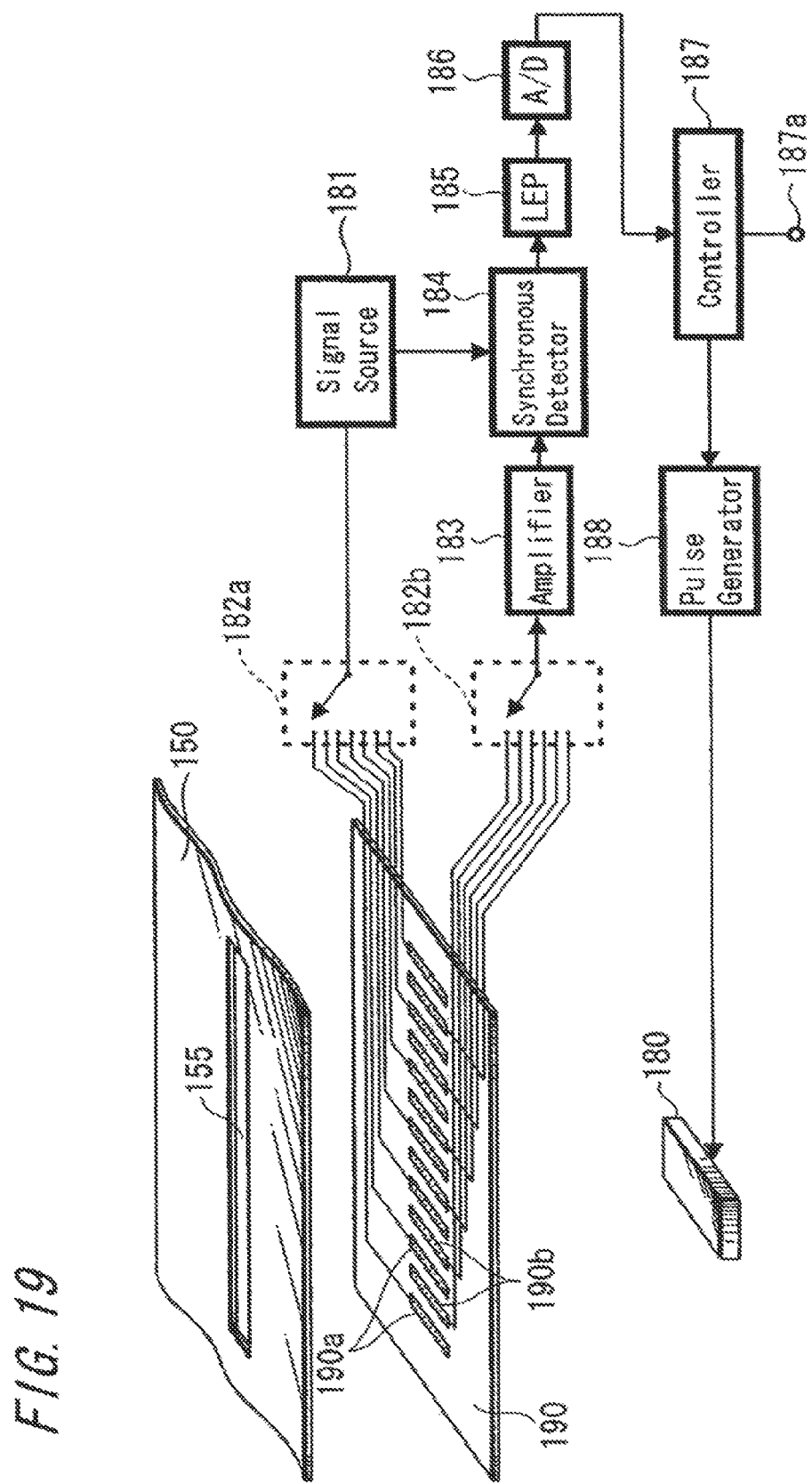
FIG. 19 is an explanatory diagram showing a constitutional example of an input apparatus (example 2 of a slider type) according to a second exemplified embodiment of the present invention.

It should be noted that it is possible to employ other arrangement also with respect to the electrode arrangement in a case when a slider type input apparatus is applied. For example, as shown in FIG. 19, in a case when a plurality of electrodes are aligned linearly with a fixed distance on a substrate 190 disposed on a backside of the linear convex portion 155, electrodes 192a of a first group and electrodes 192b of a second group are divided one by one and alternately. The electrode 192a of the first group is supplied with a signal in a time divisional manner from the signal source 181 through a change-over switch 182a. Also, it is constituted such that a change-over switch 182b which is switched in cooperation with the change-over switch 182a is provided and the signals obtained in the electrodes 192b of the second group are supplied to the amplifier 183 in a time divisional manner.

The constitution for processing the output of the amplifier 183 is made to be same as the constitution shown in FIG. 18. More specifically, an output of the amplifier 183 is supplied to the synchronous detector 184 so as to perform a detection in synchronism with the output of the signal source 181, the detected signal is passed through the low pass filter 185, thereafter made to be data in the analog/digital converter 186, and the converted data are judged in the controller 187. Also, a control of a pulse supplied from the pulse generator 188 to the vibrator 180 is carried out based on the judged condition of the controller 187 and a vibration corresponding to a click feeling is generated.

In a case when the constitution as shown in FIG. 19 is employed, the receiving signal strength of the receiving electrode 192b at the contact position also lowers and it is detected by the controller 187 that a contact exists at that position. Also with respect to a case of this example, the detection is possible with respect to simultaneous contacts at a plurality of positions.

Figure 20:
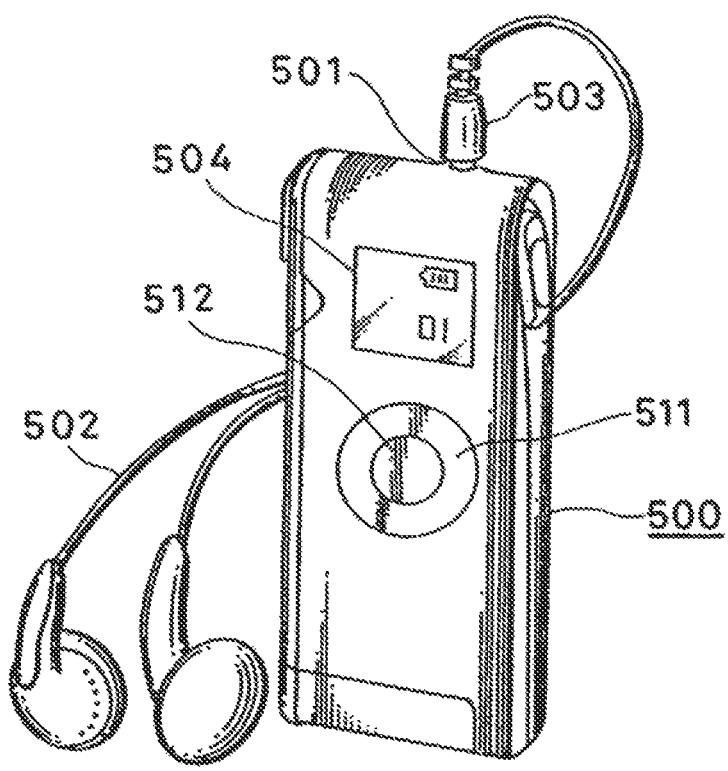
FIG. 20 is an oblique perspective view showing an example applying an input apparatus according to a second exemplified embodiment of the present invention to audio equipment.
Figure 21A:
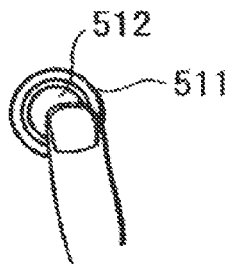
FIGS. 21a to 21G is explanatory diagrams respectively showing operational examples of a jog dial type input apparatus according to a second exemplified embodiment of the present invention.
Figure 21E:
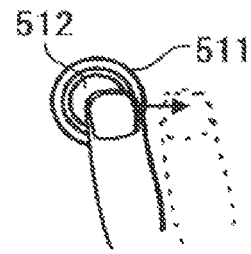
Figure 21B:
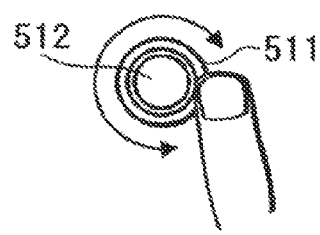
Figure 21F:
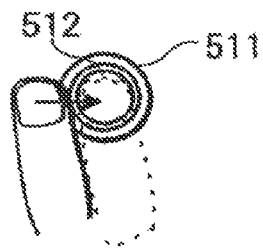
Figure 21C:
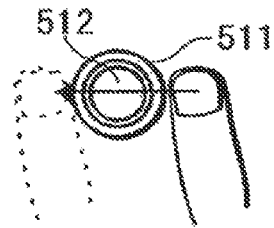
Figure 21G:
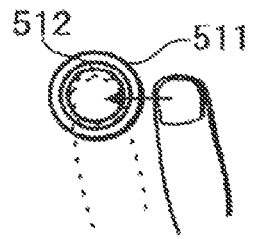
Figure 21D:
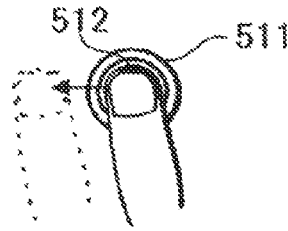

Next, it will be explained about an example where an input apparatus explained until now is to be mounted on electronic equipment. FIG. 20 is a diagram showing an example applied to portable type audio equipment. This example shows portable type audio equipment 500 which is provided with a jack 501 for connecting a headphone and a plug 503 of a headphone 502 is connected to the jack 501. Then, an audio signal stored (recorded) on a medium (semiconductor memory, etc.) in the equipment 500 is reproduced such that the reproduced audio is to be listened-in through the headphone 502. A display unit 504 for displaying a reproducing circumstance and the like is provided on a face of the equipment 500. Then, a so-called jog dial type input apparatus of the present invention composed of an annular operation unit (convex unit) 511 and a push button unit 512 disposed at the center of the annular operation unit is disposed on a face of a housing constituting the equipment 500 and adjacent to the display unit 504. The input apparatus is realized, for example, by a constitution shown in FIG. 17.

As for operation examples on the condition that the annular operation unit 511 and the push button unit 512 are disposed in this manner, there are operation examples, for example, such as shown in FIGS. 21a to 21G. More specifically, it can be carried out relating to an operation for pushing down the push button unit 512 (FIG. 21a), a rotational operation touching the annular operation unit 511 by a finger like turning it (FIG. 21b), an operation for moving a finger from the right edge of the annular operation unit 511 to the left edge of the annular operation unit 511 by passing through the push button unit 512 (FIG. 21C), an operation for pushing down the push button unit 512 and thereafter moving it to the left side (FIG. 21D), an operation for pushing down the push button unit 512 and thereafter moving it to the right side (FIG. 21E), an operation for touching the left edge of the annular operation unit 511 and thereafter pushing down the push button unit 512 (FIG. 21F), an operation for touching the right edge of the annular operation unit 511 and thereafter pushing down the push button unit 512 (FIG. 21G) and the like.

In a case when these operations are detected by the controller in the input apparatus, the operation modes corresponding to respective operations are to be set and input processes in the operation modes are to be performed such that various operations become possible for the audio equipment 500 by using the annular operation unit 511 and the push button unit 512.

Figure 22:
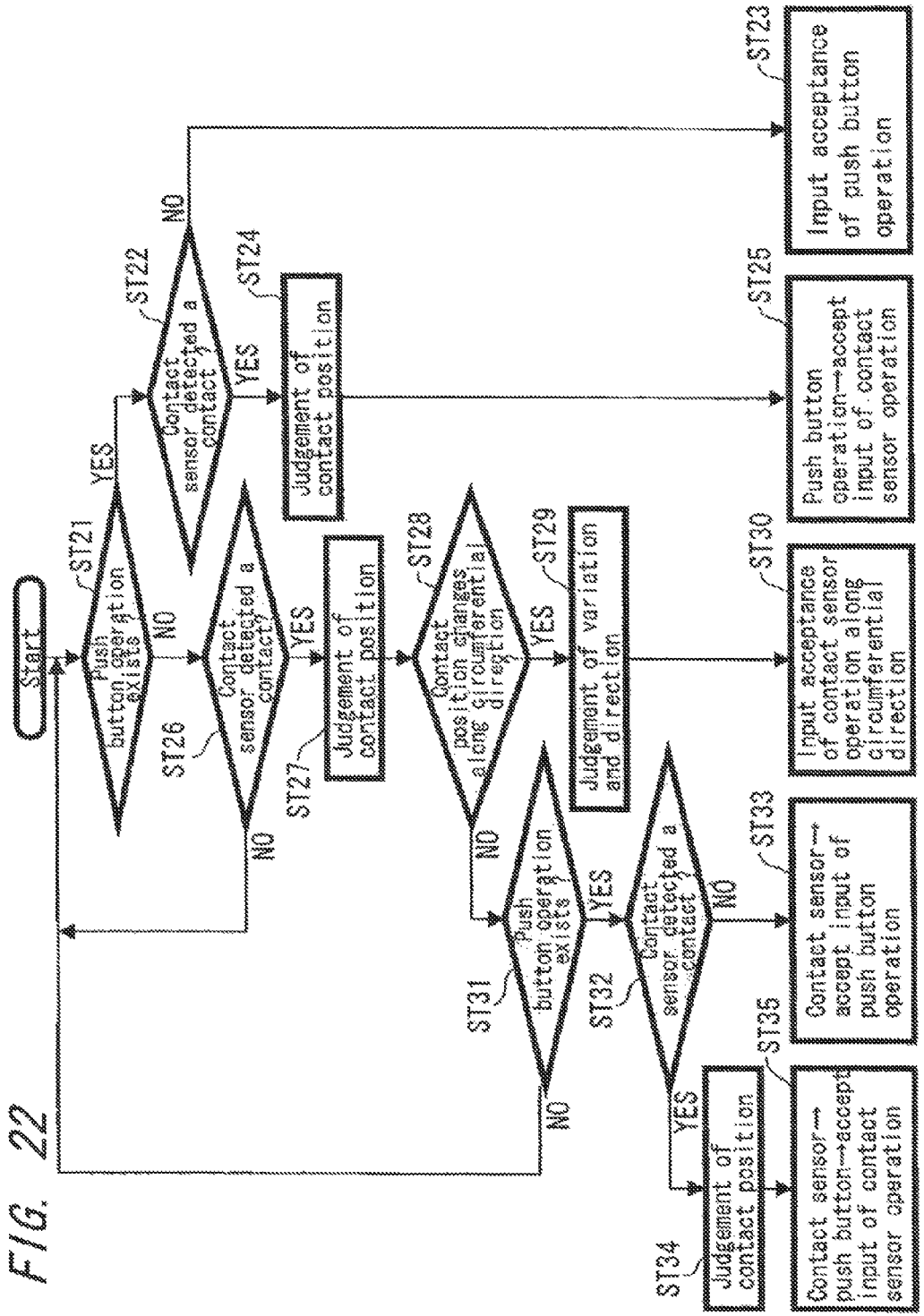
FIG. 22 is a flow chart showing an input judgment example according to the operational examples in FIGS. 21a to 21G.

The flow chart of FIG. 22 is a process example for discriminating respective operation conditions shown in FIG. 21 by the controller. For example, first, the controller judges whether or not an operation of the push button exists (step ST21) and in a case when an operation of the push button is detected, it is judged after the operation detection of the push button whether or not a detection of a contact exists in the annular operation unit constituted as a contact sensor (step ST22). Here, in a case when a contact in the annular operation unit is not detected, it is judged that there exists merely an operation of the push button and the flow is shifted to step ST23 so as to perform a process for accepting an input of the push button operation. The input accepting process of this step ST23 corresponds, for example, to an operation of FIG. 21A.

In a case when a contact to the annular operation unit is detected in step ST22, the contact position is judged (step ST24). Then, the flow is shifted to step ST25, and the operation of the push button and a process thereafter for accepting the input corresponding to the contact at a specific position in the annular operation unit are performed. The input accepting process of this step ST25 corresponds, for example, to an operation of FIG. 21D or FIG. 21E.

In a case when an operation of the push button is not detected in step ST21, the flow is shifted to step ST26 so as to judge whether or not a detection of a contact in the annular operation unit constituted as a contact sensor exists. Here, in a case when a contact is not detected in the annular operation unit, the flow returns to a judgment of step ST21 and stands by until any one of the operations is performed. Then, in a case when a contact in the annular operation unit is detected in step ST26, the contact position is judged (step ST27). Further, it is judged whether or not the contact position changes along the circumferential direction of the convex portion (step ST28), in a case when it is judge that the contact position changes along the circumferential direction, its variation and the changing direction are judged (step ST29), and an input accepting process corresponding to the judged direction and variation is performed (step ST30). The input accepting process of this step ST30 corresponds, for example, to the operation of FIG. 21b.

In a case when a change of a contact position along the circumferential direction is not detected in step ST28, it is judged whether or not an operation of the push button exists (step ST31) and in a case when an operation of the push button is not detected, the flow returns to step ST21 and stands by until any one of the operations is performed. In a case when an operation of the push button is detected in step ST31, it is judged further thereafter whether or not a detection of a contact exists in the annular operation unit constituted as a contact sensor (step ST32). In a case when a contact in the annular operation unit is not detected according to this judgment, an input accepting process corresponding to a contact operation on a specific position at the annular operation unit and an operation of the push button thereafter is performed (step ST33). The input accepting process of this step ST33 corresponds, for example, to the operation of FIG. 21F or FIG. 21G.

In a case when a contact in the annular operation unit is detected according to the judgment in step ST32, the contact position is judged (step ST34). Then, a contact operation in the annular operation unit, an operation of the push button thereafter and a process for accepting the input corresponding to the contact operation in the annular operation unit further thereafter are performed (step ST35). The input accepting process of this step ST35 corresponds, for example, to an operation of FIG. 21C.

In this manner, it becomes possible to discriminate respective operation examples shown in FIGS. 21A to 21G by the controller. Here, since the operation examples are for the audio equipment 500, various operations necessary for the audio equipment become possible only by using the operation unit 511 and the push button unit 512 if respective operations are allotted to operations of respective functions which are necessary for the audio equipment. For example, almost all operations necessary for the audio reproduction become possible by allotting the rotational operation shown in FIG. 21b to an adjustment of the reproduced sound volume, by allotting the operation of the push button unit 512 merely shown in FIG. 21A to a reproducing stop operation and by allotting other operations to a reproduce start, a track shift and the like.

Then, since the annular operation unit 511 has a constitution of detecting a contact by using electrodes disposed inside even though the input apparatus can carry out such complicated operations, an input apparatus can be constituted as a very thin type and it is easy to install it in small-sized audio equipment 500. In addition, in case of operating by using the annular operation unit 511, a vibration is to be generated corresponding to the movement of the contact position for the sake of operationality, so that a feeling corresponding to a click feeling can be obtained similarly as in a case when a roller having a click feeling such as that in a conventional jog dial type input apparatus is to be rotated and satisfactory operationality can be obtained.

Figure 23:
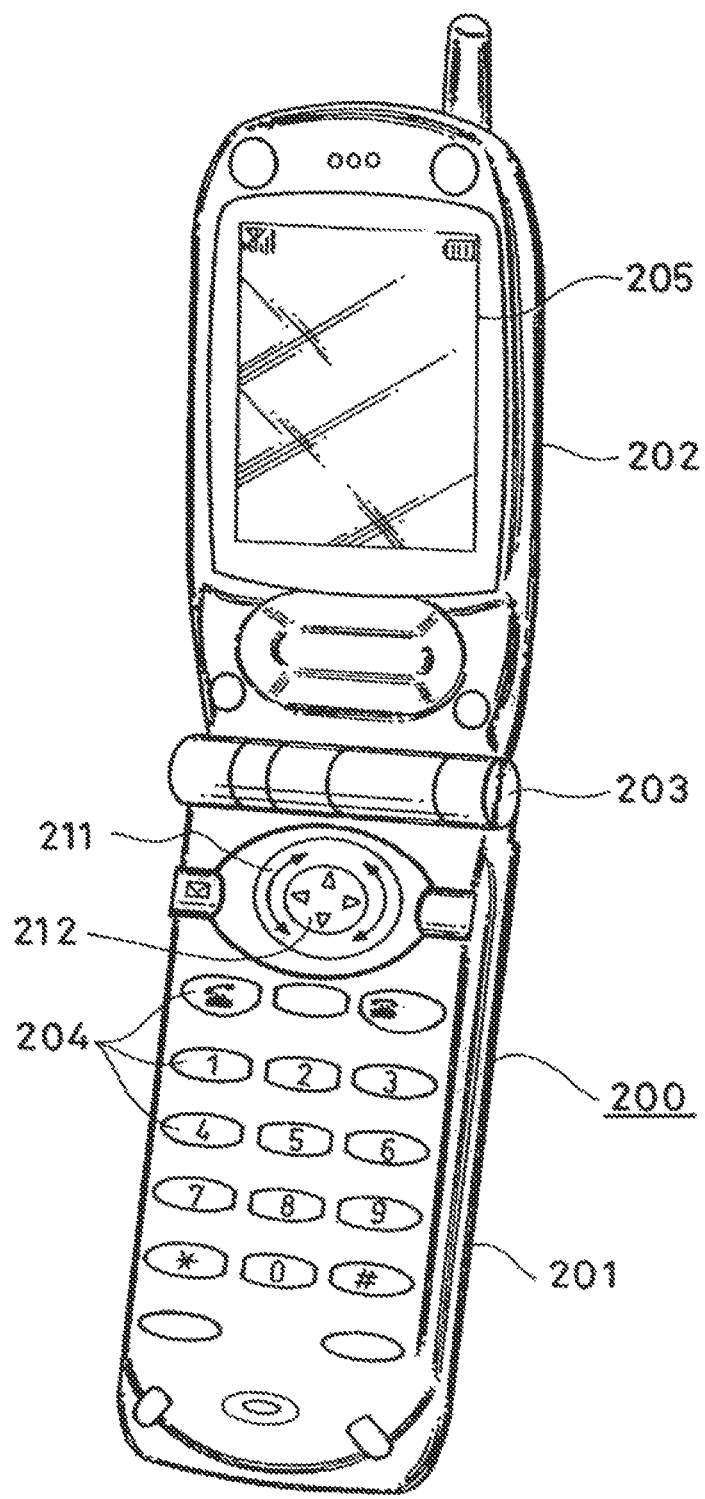
FIG. 23 is an oblique perspective view showing an example applying an input apparatus according to a second exemplified embodiment of the present invention to a portable telephone terminal.

In the example of FIG. 20, an example is shown where an input apparatus of this invention is applied to audio equipment, but the input apparatus of this invention is also applicable to other electronic equipment. For example, it can be disposed on a portable telephone terminal 200 as shown in FIG. 23. More specifically, the portable telephone terminal 200 is to be constituted such that a first housing 201 and a second housing 202 are joined at a junction portion 203 so as to be foldable. In this case, keys 204 such as a dial key and a function key are disposed on the first housing 201, a display unit 205 is disposed on the second housing 202 and an annular operation unit (convex portion) 211 and a push button unit 212 at the center of the operation unit 211 are further disposed in the first housing 201 such that a so-called jog dial type input apparatus according to this invention is disposed.

With respect to the push button unit 212 here, it is not a switch of a simple push button, but it is constituted as a push button which is combined with a plurality of push buttons (for example, four ones) and can appoint directions such as up and down, right and left or the like according to its pushing down direction. Then, the annular operation unit 211 which can carry out an input according to a contact of a finger or the like is disposed such as surrounding the push button unit 212. This input apparatus can be applied, for example, to the constitution of the input apparatus shown in FIG. 17. However, the push button unit 212 has a different number of buttons, so that it is necessary to make a slight change in the constitution from that shown in FIG. 17.

By providing an input apparatus constituted in this manner on the portable telephone terminal 200, various input operations necessary for the telephone terminal can be carried out by using the annular operation unit 211 and the push button unit 212. In case of this portable telephone terminal, the annular operation unit 211 can be constituted as a thin type, so that it is easy to install it into a thin type portable telephone terminal. In addition, a satisfactory operationality can be secured with respect to the operationality. More specifically, in case of operating by using the annular operation unit 211, a vibration is to be generated corresponding to the movement of the contact position, so that a feeling corresponding to a click feeling can be obtained similarly as in a case when a roller having a click feeling such as that in a conventional jog dial type input apparatus is to be rotated and satisfactory operationality can be obtained. It should be noted that it is possible to employ a constitution using a dedicated vibrator 180 as a vibration means for vibrating the vicinity of the input apparatus as explained in FIG. 10 or the like in a case when an input apparatus of this invention is installed in the portable telephone terminal 200, and it is also possible to vibrate the terminal temporarily in case of operating by means of the annular operation unit 211 by using a vibration means for vibrating when receiving signals in a case, for example, when the portable telephone terminal is a terminal provided with a function of notifying receiving signals by vibrating the terminal when receiving signals. Conversely, it is possible not only to vibrate the vibrator 180 provided with this invention when being operated by the operation unit but also to use it as a vibration means for vibrating the terminal when receiving signals.

Also, with respect to the annular operation unit 211 in this example, it is formed as an elliptical shape but not as a perfect circle shape as shown in FIG. 23, but the shape of the operation unit can be arbitrarily changeable in conformity with the shape of the equipment to be applied, because the member of the operation unit according to this example has no mechanism which is physically rotational such as that of a conventional jog dial.

Figure 24:
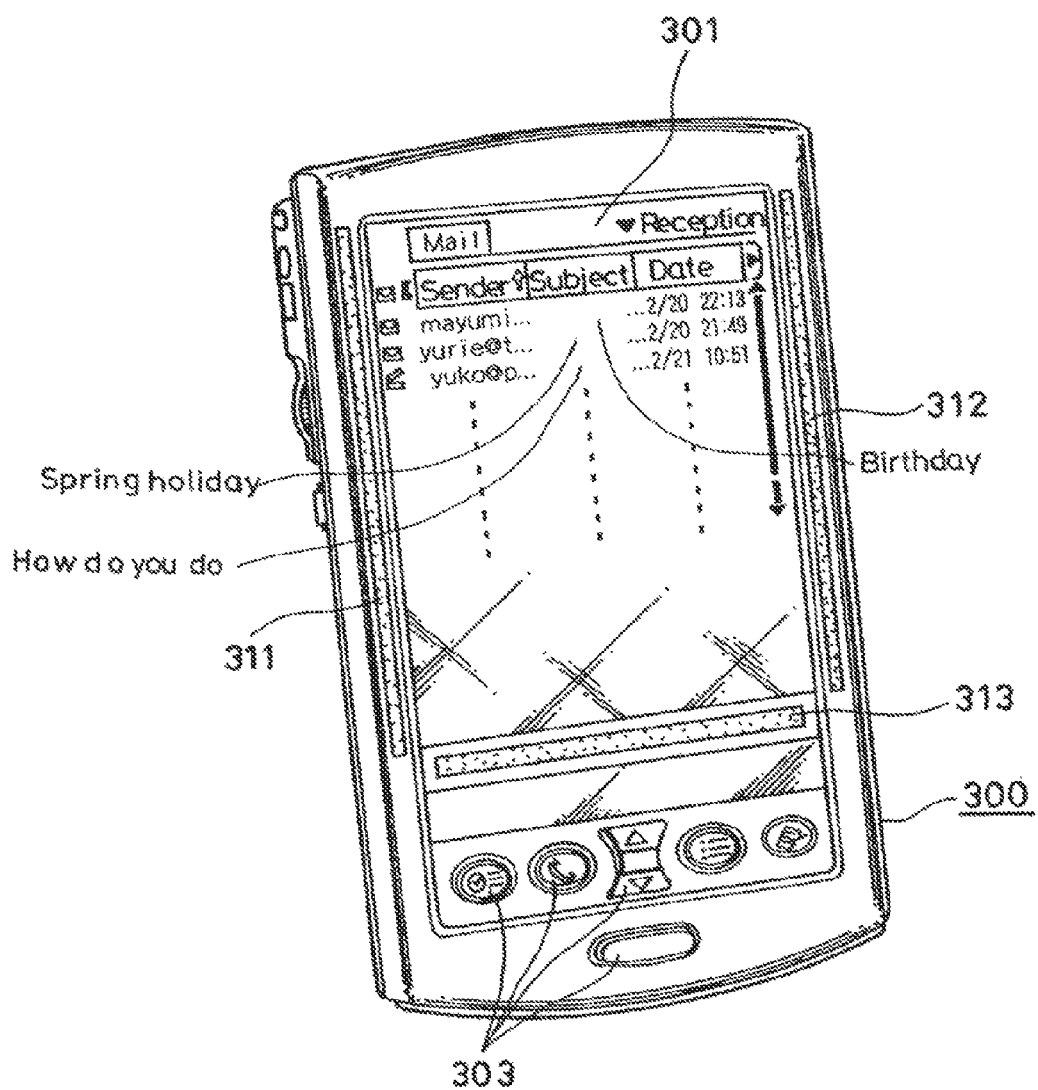
FIG. 24 is an oblique perspective view showing an example applying an input apparatus according to a second exemplified embodiment of the present invention to a PDA.

Next, an example in which an input apparatus of this invention constituted as a slider type input apparatus is installed in electronic equipment will be explained. FIG. 24 is an example in which a slider type input apparatus of this invention is installed in a portable type data processing terminal which is referred to as PDA (Personal Digital Assistants). The PDA 300 is constituted to have a thin type of and perpendicularly long housing in which a comparatively large-scaled display unit 301 is disposed on the front face and several operation keys 303 are disposed on the downside. A display of character data such as a received E-mail, a schedule and the like or a display of map data stored in a memory within the terminal and the like can be carried out on the display unit 301. It should be noted that, in case of displaying maps on the PDA 300 of this example, it is designed such that the reduction of display can be changed by two or more steps.

Then, it is constituted here such that slider type operation units 311, 312 and 313 are disposed along the borders of the three sides of the quadrangle display unit 301. More specifically, with respect to the display unit 301, there are disposed a slider type operation unit 311 on the left side, a slider type operation unit 312 on the right side and a slider type operation unit 313 on the downside respectively. Each of the slider type operation units 311, 312 and 313 is constituted, for example, as an input apparatus shown in FIG. 18 or FIG. 19 such that they can operate when the operation unit is touched by a finger or the like. In this case, it is constituted such that simultaneous contacts on a plurality places can be also detected according to the principle shown in FIGS. 13 and 14.

Figure 25A:
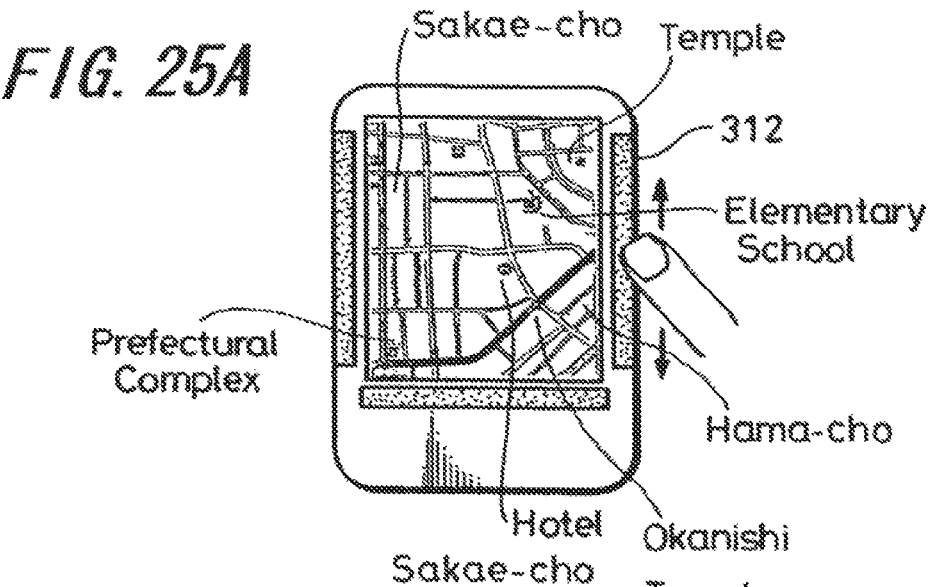
FIGS. 25A to 25C are explanatory diagrams respectively showing operational examples of a slider type input apparatus according to a second exemplified embodiment of the present invention.
Figure 25B:
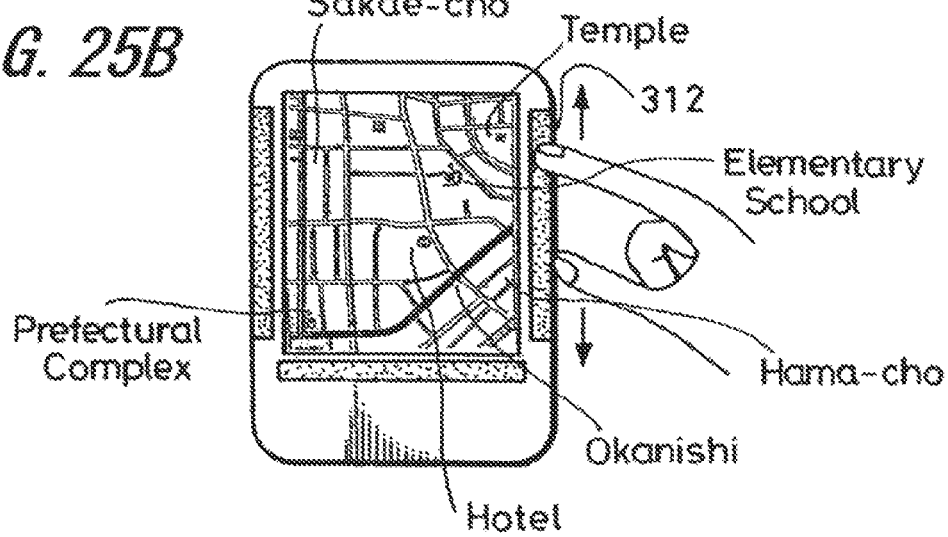
Figure 25C:
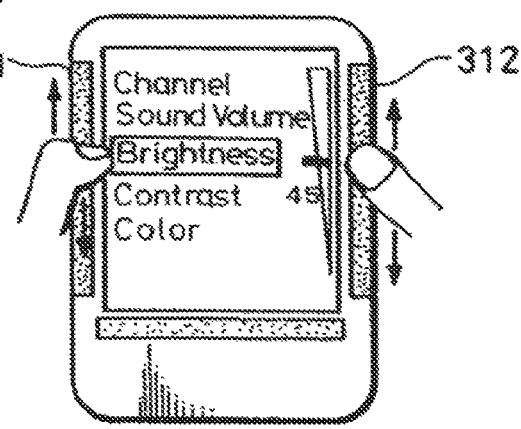

Here, an input process using the slider type operation units 311, 312 and 313 is to be performed according to a process mainly related to a picture screen displayed on the display unit 301. FIGS. 25A to 25C are diagrams showing examples of operation conditions. Here, it is assumed that at least three kinds of operations can be carried out.

More specifically, in a case when a map or the like is displayed on the display unit 301, it is constituted as shown in FIG. 25A such that if the slider type operation unit is touched by one finger and the touched position is moved, the display region of the display screen (map, etc.) is to be scrolled according to that movement. In this case, the scroll of the display region in a longitudinal direction is performed by the operation of the slider type operation unit 311 or 312 which is disposed longitudinally and the scroll of the display region in a lateral direction is performed by the operation of the slider type operation unit 313 which is disposed laterally.

Then, in case of a map displayed and as shown in FIG. 25B, in a case when two fingers touch the slider type operation unit and an operation such as widening the distance between the two fingers is performed or in a case when an operation such as narrowing the distance between the two fingers is performed, it is constituted such that the reduction of the displayed map changes. For example, in a case when an operation such as widening the distance between the two fingers is performed, a map in which the reduction of the displayed map is made small and only a partial region is magnified is displayed on the display unit 301. Also, in a case when an operation such as narrowing the distance between the two fingers is performed, a map in which the reduction of the displayed map is made large and only a wide region is displayed by being reduced is displayed on the display unit 301.

Also, it is constituted as shown in FIG. 25C such that in a case when the slider type operation unit 311 on the left side and the slider type operation unit 312 on the right side are touched simultaneously to be operated, an adjusting mode for adjusting a setting circumstance of the equipment or the like is obtained and an adjustment is carried out.

Process examples in the controller in a case when operations relating to scrolling, magnifying and reducing of the picture screen as shown in FIGS. 25A and 25B are performed will be explained with reference to the flow chart of FIG. 26. First, it is judged whether or not a contact is detected at only one place of any one of the operation units (step ST41). In a case when a contact at only one place is detected according to this judgment, it is judged whether or not the contact position is changing (step ST42). In a case when the contact position does not change, the flow returns to the judgment of step ST41 and stands by.

In a case when the contact position changed according to the judgment of step ST42, scrolling of the picture screen corresponding to contact position is performed (step ST43). At this time, the scroll at this time is performed with respect to the direction in which the contact position changes. More specifically, in a case when a change of the contact position upward is detected for the slider type operation unit 311 or 312 of the right and left, the display screen is scrolled upward and in a case when a change of the contact position downward is detected for the slider type operation unit 311 or 312 of the right and left, the display screen is scrolled downward. Also, in a case when a change of the contact position to the left direction is detected for the slider type operation unit 313 on the downside, the display screen is scrolled to the left direction and in a case when a change of the contact position to the right direction is detected for the slider type operation unit 313 on the downside, the display screen is scrolled to the right direction.

Also, in a case when it is judged according to the judgment of step ST41 that the contact is not for only one place, it is judged whether or not there are simultaneous contacts of two places within one operation unit (step ST44). When it is judged according to this judgment that it is other than simultaneous contacts of two places, the flow returns to the judgment of step ST41 and stands by. In a case when it is judged according to the judgment of step ST44 that there are simultaneous contacts of two places, it is judged whether or not the width between the two contacted places changes such as being widened (step ST45). In a case when it is judged here that it is widened, the reduction of the displayed map is changed to a small reduction in response to the widened width (step ST46). For example, it is designed such that the reduction of the display changes so as to display a magnified map of a small reduction by one step every time when the distance between the two fingers touching the one operation unit is widened by approximately 1 cm.

Also, in a case when it is judged according to the judgment of step ST45 that the width between the two places is not widened, it is judged whether or not the width between the two contacted places is changing such as being narrowed (step ST47). In a case when it is judged here that it is narrowed, the reduction of the displayed map is changed to a large reduction in response to the narrowed width (step ST48). For example, it is designed such that the reduction of the display changes so as to display a reduced map of a large reduction by one step every time when the distance between the two fingers touching the one operation unit is narrowed by approximately 1 cm.

In a case when it is not detected in step ST47 that it is narrowed, the flow returns to the judgment of step ST41 and stands by. Also, the flow returns to step ST41 after the input processes of steps ST43, ST46 and ST48 are performed and stands by until there is a next operation.

Figure 26:
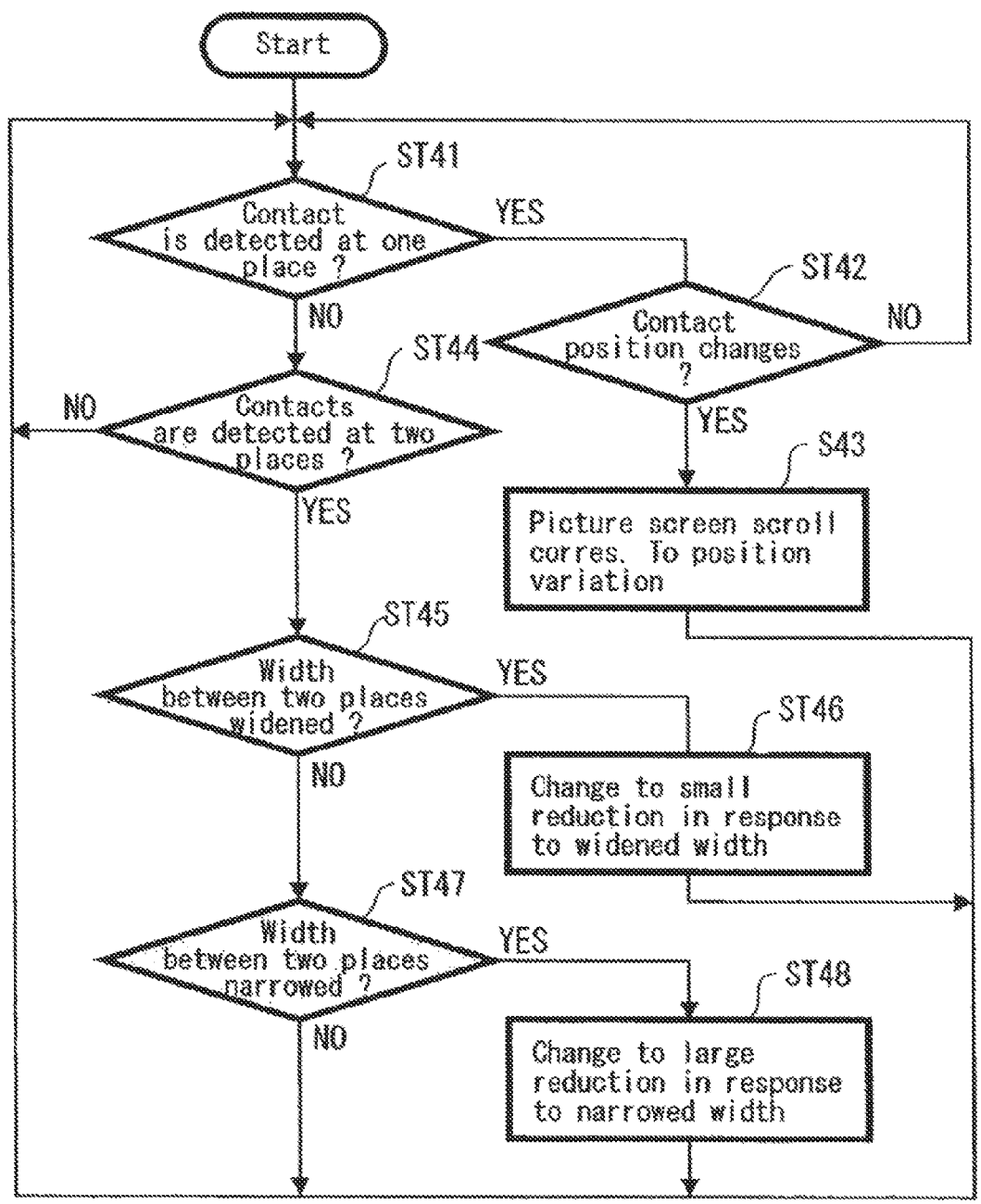
FIG. 26 is a flow chart showing a process example according to the operational examples of FIGS. 25A to 25C.

By being processed as shown in the flow chart of FIG. 26, it is possible to perform operations of scrolling the displayed map and reduction-setting of the display easily by using a slide type operation unit. It should be noted that the reduction of the display is to be changed here, because an example of displaying a map is taken, but it is possible to change the display magnification according to a similar process when characters, figures or the like other than a map are displayed.

More specifically, it is possible to perform a magnifying process such as making the display magnification high in a case when there is an operation such as widening the distance between two fingers and to perform a reducing process such as making the display magnification low in a case when there is an operation such as narrowing the distance between two fingers.

Figure 27:
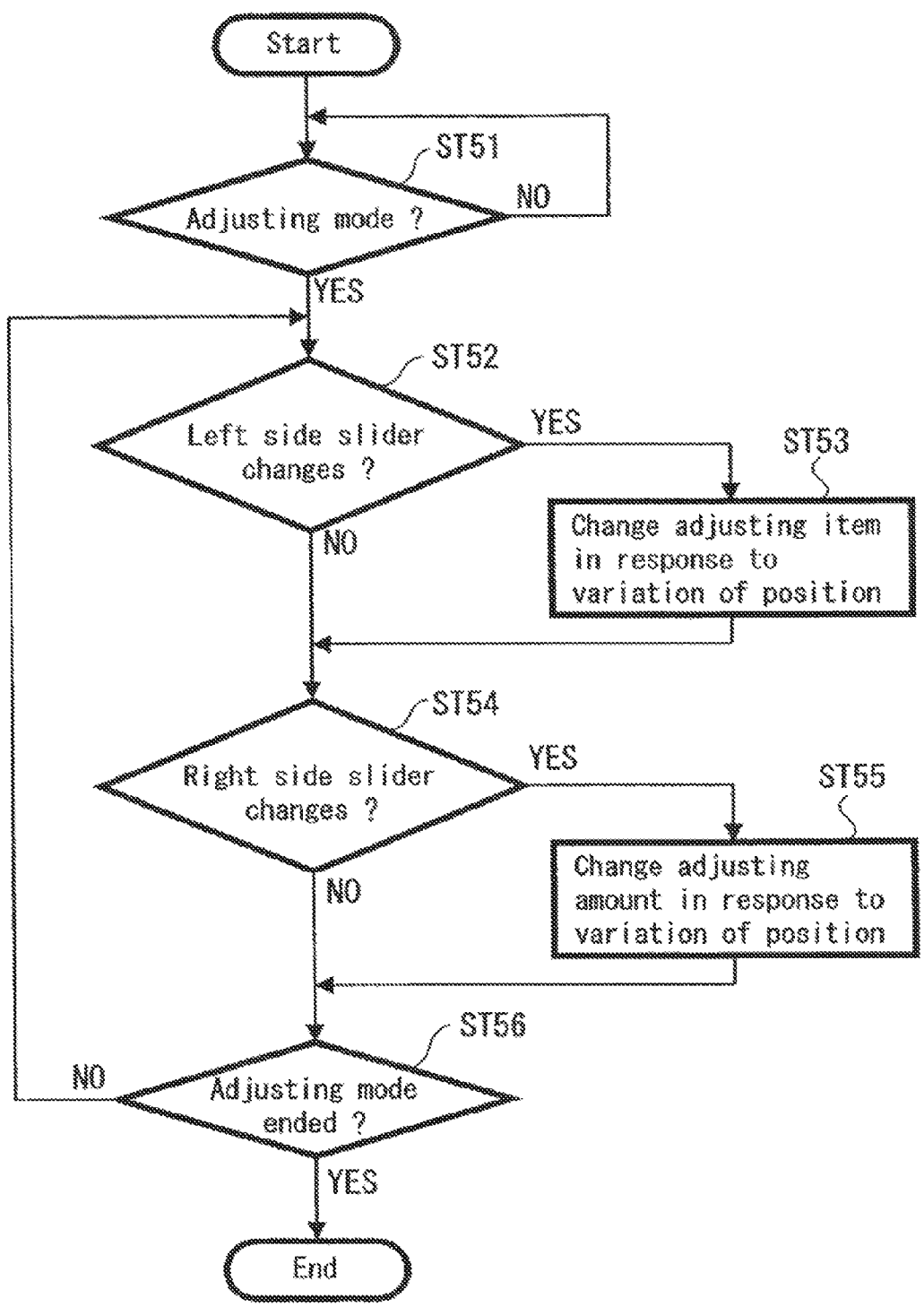
FIG. 27 is a flow chart showing a process example in a case of an adjusting mode according to the operational examples of FIGS. 25A to 25C.

Next, a process example according to the control of the controller in a case when the two slider type operation units 311 and 312 are operated simultaneously as shown in FIG. 25C will be explained with reference to the flow chart of FIG. 27. First, controller judges whether or not there is an operation for making an adjusting mode (step ST51). Here, an adjusting mode is supposed to be established in a case when it is detected that the two operation units 311 and 312 are contacted simultaneously. In case of not detecting such a contact condition, it remains and stands by. It should be noted that it is possible to design with respect to an operation for making an adjusting mode such that an operation of another key or the like is to be necessary.

In a case when an adjusting mode is established by this process, a list of adjusting items is displayed to the left of the picture screen on the display unit 301 and it is to be displayed that one adjusting item is selected therein as shown in FIG. 25C as an example. Also, an adjusting amount for the selected item is to be displayed to the right of the picture screen. In the displayed example of FIG. 25C, a condition is shown where an adjustment for the brightness of the picture screen [brightness] is selected as an adjusting item and 45% brightness is set as an adjusting amount.

It is detected in step ST51 that an adjusting mode is established and in a case when an adjusting picture screen was displayed, it is judged whether or not the contact position detected in the operation unit 311 on the left side changes (step ST52). Here, in a case when the contact position detected in the operation unit 311 on the left side changes, the adjusting item is changed in response to the variation of the position and the display is also changed correspondingly (step ST53). For example, when the contact position detected in the operation unit 311 changes a little bit to the upper side on a condition that [brightness] is selected as an adjusting item as shown in FIG. 25C, it will be changed to [volume] which is displayed on the upper side of [brightness]. In a case when a change of the contact position in the operation unit 311 on the left side is not detected in step ST52 and after and a process for changing the adjusting item is performed in step ST53, the flow is shifted to step ST54 whether or not the contact position detected in the operation unit 312 on the right side changes. Here, in a case when the contact position detected in the operation unit 312 on the right side changes, the adjusting amount relating to the adjusting item selected at that time is changed in response to the variation of the position and the display thereof is also changed correspondingly (step ST55). For example, when the contact position detected in the operation unit 312 changes to the upper side or to the downside on a condition that [brightness] is selected as an adjusting item as shown in FIG. 25C, the value will be changed up or down from the adjusting amount of 45% at present.

Thereafter, it is judged whether or not a process for ending the adjusting mode was performed (step ST56). As for the judgment here, for example, an item designated as "adjusting mode ended" is provided for one of the adjusting items which are set according to the change of the contact position in the operation unit 311 on the left side such that the adjusting mode is to be ended in case of selecting that item by the operation of the operation unit 311 on the operation unit 311.

Alternatively, the adjusting mode is to be ended in a case when a condition that there is no contact in the two operation units 311 and 312 becomes beyond a period of a certain degree. Further alternatively, the adjusting mode is to be ended by an operation of any of the keys. In a case when an ending process of the adjusting mode is not performed, the flow returns to the judgment of step ST52.

In this manner, it is possible to carry out an adjusting operation of data set in the equipment easily by using two slider type operation units 311 and 312 on the right hand and on the left hand and by using a finger of a hand holding the PDA 300 or the like. It was explained here in connection with an example for performing an adjustment, but it is possible to perform other input operation by a similar process.

Figure 28:
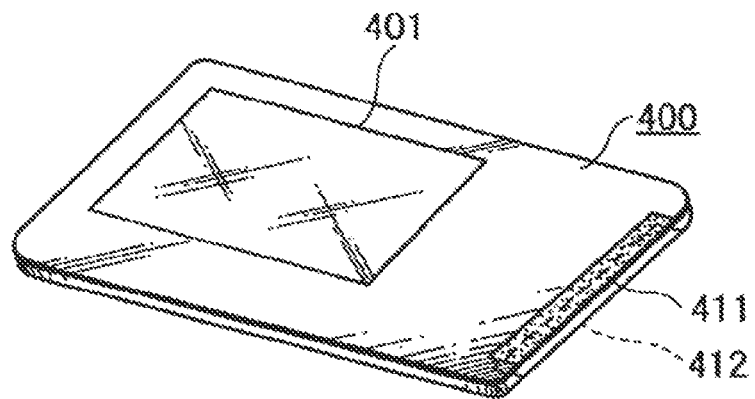
FIG. 28 is an oblique perspective view showing an example applying an input apparatus according to a second exemplified embodiment of the present invention to card type equipment.

Next, an example will be explained where an input apparatus of this invention constituted as a slider type input apparatus is installed in another electronic equipment. FIG. 28 shows an example in which a slider type input apparatus of this invention is installed in a card type data processing terminal (hereinafter referred to as card type equipment). The card type equipment 400 of this example is constituted in a card shaped and thin type of housing, is provided with a display unit 401 and the like, and a slider type operation unit 411 is disposed on the face of the end face of the equipment (namely, a card), and further, a slider type operation unit 412 is disposed also on the backside and at the backside position of the slider type operation unit 411.

Each of the slider type operation units 411 and 412 is constituted as an input apparatus shown, for example, in FIG. 18 or FIG. 19 and the operation is made possible by a finger or the like touching the operation unit. In this case, it is constitution such that simultaneous contacts of a plurality of places can also be detected according to the principle shown in FIGS. 13 and 14.

Figure 29A:
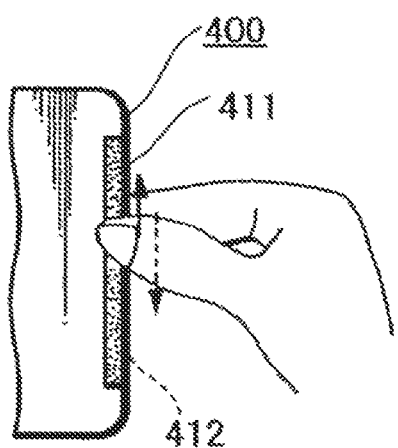
FIG. 29A and FIG. 29B are explanatory diagrams respectively showing operation examples of the example of the equipment in FIG. 28.
Figure 29B:
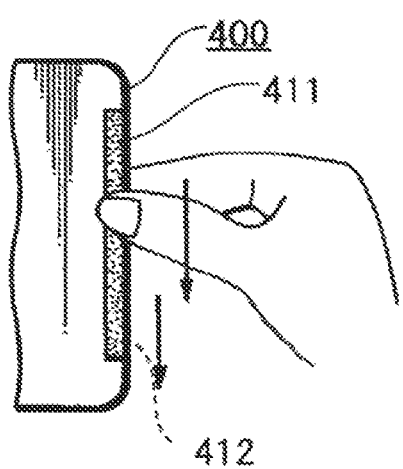

FIGS. 29A and 29B are diagrams showing an example of operation conditions of the equipment 400. Here, it is constituted such that the operation can be carried out not only by an operation using the operation unit 411 or 412 on each side alone but also by an operation using the operation units 411 and 412 on both of the front and the back sides simultaneously. More specifically, as shown in FIG. 29A, the operation units 411 and 412 are touched such as the end faces on which the operation units 411 and 412 of the card type equipment 400 are disposed are put between two fingers, the touched position of the operation unit 411 of the front side is moved to the upper side by one of the fingers touching, and the touched position of the operation unit 412 of the backside is moved to the downside by the other of the fingers. By operating such as enlarging the distance between the two fingers in this manner, for example, a zooming process is performed in order to change the display reduction or the display magnification of the picture screen displayed on the display unit 401 to one direction similarly as an example shown in FIG. 25B with reference to the PDA 300 mentioned above. Also, in a case when the distance between the two fingers is operated so as to be narrowed conversely with respect to the operation of FIG. 29A, the display magnification or the display reduction (or display magnification) of the picture screen is changed to the opposite direction.

Also, as shown in FIG. 29B, when the operation units 411 and 412 are touched such as the end faces on which the operation units 411 and 412 of the card type equipment 400 are disposed are put between two fingers and the two fingers touching are moved downward approximately simultaneously, the display position of the picture screen displayed on the display unit 401 is scrolled downward. Also, when the two fingers are moved upward approximately simultaneously conversely with respect to the operation of FIG. 29B, the display position of the picture screen displayed on the display unit 401 is scrolled upward.

Figure 30:
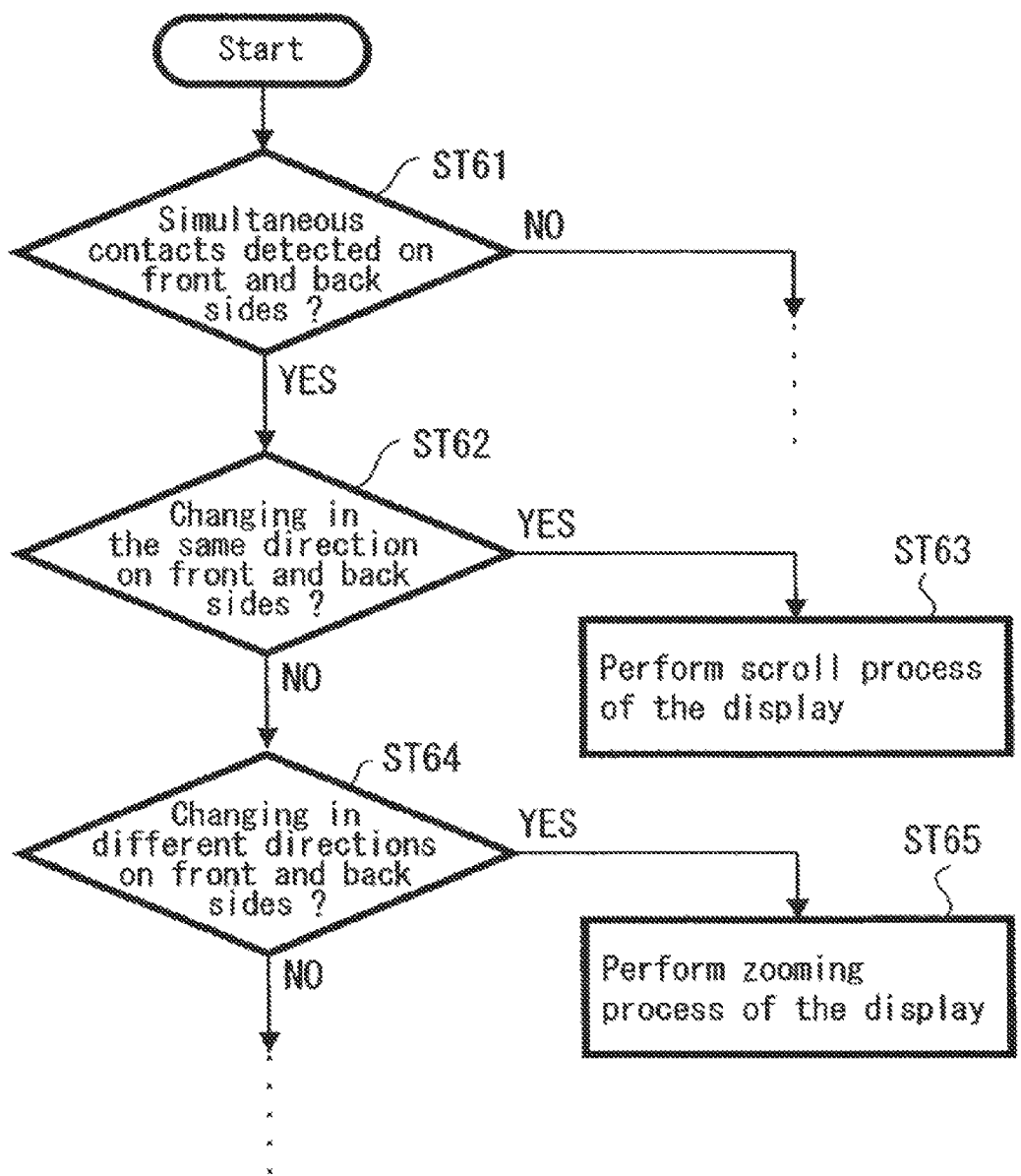
FIG. 30 is a flow chart showing a process example according to the operational examples in FIGS. 29A and 29B.

To explain a process example in the controller in case of performing the input process in this manner with reference to a flow chart of FIG. 30, first, it is judged whether or not it is detected that simultaneously contacts exist in the slider type operation units 411 and 412 on the front and back sides (step ST61). In a case when a condition in which only either one of operation units is contacted or a condition in which there is no contact at all was detected according to that judgment, the flow is shifted to other process which is not shown. Then, in a case when it was detected that simultaneously contacts exist in the operation units 411 and 412, it is judged whether or not the contact positions are changing in the same direction in the slider type operation units 411 and 412 on the front and back sides (step ST62). Here, in a case when it is judged that they are changing in the same direction, the flow is shifted to step ST63 and performs a scroll process of the display.

Also, in a case when a change in the same direction is not detected in step ST62, it is judged whether or not they are changing in the different direction in the slider type operation units 411 and 412 on the front and back sides (step ST64). Here, in a case when it is judged that they are changing in the different directions, the flow is shifted to step ST65 and a zooming process of the display is performed.

The slider type operation units 411 and 412 are provided on both the front and back sides in this manner and a scrolling process, a zooming process and the like of the display are performed according to the operation conditions of the two slider type operation units 411 and 412, so that a highly technical operation becomes possible by using only fingers of one hand for holding while, for example, the card type equipment 400 is held by that one hand. It should be noted that a scroll process and a zooming process of the display are to be performed here, but it is possible to perform an input process of other function necessary for the equipment 400 according to a similar operation.

It should be noted that the equipment 200, 300, 400 and 500 so far explained show examples of equipment to be applied with a jog dial type or a slider type operation unit and it is needless to say that the operation unit of this invention can be applied also to various electronic equipment other than these of equipment 100 to 400.

Also, in the example of the input apparatus shown in FIGS. 10 to 19, it is constituted such that a click feeling is obtained by providing the vibrator 180 and by applying a temporary vibration based on the detect of the contact position, but it is possible to employ a constitution where such a vibration means is omitted for no vibration relying upon equipment to be applied. Further, in case of providing the vibrator 180, it is also possible to employ a constitution where it does not vibrate relying upon the operation mode.

Also, in the circuit constitution of the input apparatus shown FIGS. 10 to 19, signals transmitted to respective electrodes were detected in a time divisional manner by applying signals to respective electrodes in a time divisional manner, but it is possible to constitute such that signals transmitted to respected electrodes are to be detected by means of other constitution or process.

Also, it is constituted in the examples explained so far such that the input apparatus detects a contact of a finger which is a living body within a restricted region such as an annular or a linear convex portion, but it is needless to say that it is possible to detect a contact of a material body such as a pen for input other than a living body and to perform an input process based on the detection of the contact.

INDUSTRIAL APPLICABILITY

According to the present invention, a vibration is made in a case when an approach of a living body or a material body is detected in a predetermined detection region, so that in a case when the panel is approached by a finger of one hand, a pen or the like on a condition that the equipment is held by the other hand on a condition, for example, that the face of the panel of small-sized portable equipment is made as a detection region, the equipment vibrates temporarily caused by the detection of that approach and the vibration is transmitted to the hand holding the equipment such that a user is to comprehend according to the contact at the position on the panel that an input can be carried out. Consequently, it is to be comprehended from the temporary vibration just before the face of the panel is touched that an input can be carried out when the position will be touched, so that it becomes possible to operate the touch panel securely.

In this case, it is to be comprehended from a vibration not only with respect to an approach but also with respect to a contact by outputting a drive signal also in a case when a contact on a predetermined condition is detected in a detection sensor and by performing a process for vibrating temporarily in an actuator.

Also, by setting a vibration condition for vibrating the actuator in a case when an approach is detected by the detection sensor and a vibration condition for vibrating the actuator in a case when a contact is detected by the detection sensor to be different vibration conditions, it becomes possible from the vibration conditions to distinguish a condition of approaching and a condition of contacting.

Also, the detection sensor is a sensor for detecting a magnetic field or signal strength in a detection region and it is to be judged by distinguishing an approach of a living body or a material body and a contact of a living body or a material body based on a variation of the magnetic field or signal strength detected by the detection sensor, so that it becomes possible by using one sensor to detect certainly by distinguishing an approach and a contact.

Also, the judgment is performed relating to an approach and/or a contact position according to a position or a timing at which the magnetic field or the signal strength changed in the detection region of the detection sensor, so that it becomes possible to judge easily also with respect to the approach and/or the contact position.

Also, according to the present invention, a specific input is accepted in response to a position or a change of the position at which the sensor detected a contact of a living body or a material body, so that it becomes possible to accept an input by using a planar shaped contact detection sensor. Then, by temporarily vibrating at least the vicinity of the detection region every time when a change of a predetermined amount or more of the contact position occurs in the sensor, a vibration corresponding to a click feeling is transmitted to a user contacting the sensor (or a user through a material, body contacting the sensor) and a similar feeling can be obtained as if a dial having a click feeling were rotated and a satisfactory operationality can be obtained.

In this case, the contact detection sensor is composed of a transmission electrode disposed in the detection region on a predetermined condition and a receiving electrode and a contact position is detected based on the signal strength of a specific signal obtained at the receiving electrode, so that it is possible to detect simply and certainly relating to the detection of the contact position.

Also, in case of detecting a contact position by disposing the transmission electrode and the receiving electrode in such a manner, simultaneous contacts at a plurality of places are detected based on the signal strength received by the receiving electrode, so that it becomes possible to detect a plurality of simultaneous contacts easily and satisfactorily.

Also, the detection region of the contact detection sensor is made to be an annular region, so that the detection region becomes an endless constitution and the restriction for the number of steps capable of input instructions or the like disappear.

Also, the detection region of the contact detection sensor is made to be an annular region and a push button type switch is disposed inside the annular region, so that a highly technical input process becomes possible by combining the operation of the contact detection sensor and the operation of the push button type switch. For example, it becomes possible to handle various functions of operations by changing the function for accepting the input in response to detection patterns of two detections of a detection of a contact in the contact detection sensor and a detection of an operation of a push button type switch.

Also, it is constituted as a slider type input apparatus by forming the detection region of the contact detection sensor to be a linear region, so that it is possible to dispose the input apparatus satisfactory in conformity with the shape of the equipment. For example, it is possible to dispose it satisfactorily in one united body with the display apparatus by disposing this linear detection region adjacent to any one of the sides of the display means which performs the display of characters or figures.

In a case when it is disposed adjacent to the display means in this manner, it becomes possible to carry out operations relating to the display satisfactorily by making inputs of the function relating to the display on the display means to be accepted according to the detection of the contact in the contact detection sensor.

Further, it becomes possible to carry out an operation for the magnification or the reduction of the display very easily by accepting an input of the function for changing the magnification or the reduction of the display on the display means to one or the other in a case when the contact positions at two places which were detected approximately simultaneously by the one or a plurality of contact detection sensors change such as being approaching mutually and in a case when they change such as being apart mutually.

DESCRIPTION OF REFERENCE NUMERALS

11 . . . signal source
12, 13 . . . change-over switch
14 . . . amplifier
15 . . . synchronous detector
16 . . . low pass filter
17 . . . analog/digital converter
18 . . . controller
19 . . . pulse generator
20 . . . output terminal
90 . . . input pen
91 . . . coil
100, 100' . . . PDA
101 . . . display panel
110, 110' . . . substrate
111 . . . electrode (first group)
112 . . . electrode (second group)
120 . . . vibrator
150 . . . housing
151 . . . convex portion
152 . . . opening 153 ... button
154 ... axis
155 ... convex portion
160 ... substrate
161 ... electrode
162 ... opening
163 ... electrode
170 ... substrate
171, 171' ... electrode
172 ... opening
173 ... electrode
180 ... vibrator
181, 181' ... signal source
182, 182a, 182b ... change-over switch
183 ... amplifier
184 ... synchronous detector
185 ... low pass filter
186 ... analog/digital converter
187 ... controller
188 ... pulse generator
190 ... substrate
191a, 191b, 192a, 192b ... electrode
200 ... portable telephone terminal
201 ... first housing
202 ... second housing
203 ... junction portion
204 ... key
205 ... display unit
211 ... annular operation unit (convex portion)
212 ... push button unit
300 ... PDA
301 ... display unit
303 ... operation key
311, 312, 313 ... slider type operation unit
400 ... card type equipment
401 ... display unit
411, 412 ... slider type operation unit
500 ... audio equipment
501 ... jack
502 ... headphone
503 ... plug
504 ... display unit
511 ... annular operation unit (convex portion)
512 ... push button unit

The invention claimed is:

1. An apparatus comprising:
a circuitry configured to
initiate an operation command in response to a first moving operation of a first operator on a first operation surface provided on a first surface of a housing body,
initiate a command in response to a second moving operation of a second operator on a second operation surface which is provided at a different position from the first operation surface, and
initiate, according to a combination of the first moving operation and the second moving operation, a first operation command when a movement direction of the first moving operation and a movement direction of the second moving operation are substantially the same, and a second operation command when the movement direction of the first moving operation and the movement direction of the second moving operation are not substantially the same,
wherein the first surface is provided on a substantially opposite side of the housing body from a second surface on which a display is provided, and
wherein the display is configured to display respective results of the initiated commands.

2. The apparatus of claim 1, wherein the first moving operation is an operation in which a contact position of the first operator on the first surface is moved.

3. The apparatus of claim 2, wherein the result of the initiated operation command is a scrolling of an image displayed on the display.

4. The apparatus of claim 3, wherein the scrolling of the image is controlled in accordance with an amount of the first moving operation.

5. The apparatus of claim 4, wherein the image is scrolled in a substantially same direction of a moving direction of the first moving operation.

6. The apparatus of claim 1, wherein the initiated operation command is configured to control the display to zoom in or zoom out an image displayed on the display.

7. The apparatus of claim 1, wherein the first moving operation is performed by a finger of a user that is in contact with the first operation surface.

8. The apparatus of claim 1, wherein the second surface and the first surface are separately provided on opposing surfaces of the housing body.

9. The apparatus of claim 1, wherein
the first moving operation is detected according to a movement of a position of the first operator upon the first operation surface, and
the second moving operation is detected according to a movement of a position of a second operator upon the second operation surface.

10. The apparatus of claim 1, wherein one of the first operation command and the second operation command is a scroll command for scrolling an image being displayed on the display.

11. The apparatus of claim 10 wherein the other one of the first operation command and the second operation command is a zoom command for zooming-in or zooming-out an image being displayed on the display.

12. The apparatus of claim 1, wherein the first moving operation and the second moving operation are drag operations.

13. The apparatus of claim 1, wherein the first moving operation is performed on the first operation surface at a substantially same time the second moving operation is performed on the second operation surface.

14. The apparatus of claim 1, wherein the moving operation is a sliding type operation.

15. The apparatus of claim 1, wherein the display is configured to display a result of the command.

16. A method comprising:
initiating an operation command in response to a first moving operation of a first operator on a first operation surface provided on a first surface of a housing body, wherein the first surface is provided on a substantially opposite side of the housing body from a second surface on which a display is provided;
initiating a command in response to a second moving operation of a second operator on a second operation surface which is provided at a different position from the first operation surface;
initiating, according to a combination of the first moving operation and the second moving operation, a first operation command when a movement direction of the first moving operation and a movement direction of the second moving operation are substantially the same, and a second operation command when the movement direction of the first moving operation and the movement direction of the second moving operation are not substantially the same; and displaying, on the display, respective results of the initiated commands.

17. A non-transitory computer-readable medium having embodied thereon a program, which when executed by a computer causes the computer to perform a method, the method comprising:

initiating an operation command in response to a first moving operation of a first operator on a first operation surface provided on a first surface of a housing body, wherein the first surface is provided on a substantially opposite side of the housing body from a second surface on which a display is provided;

initiating a command in response to a second moving operation of a second operator on a second operation surface which is provided at a different position from the first operation surface;

initiating, according to a combination of the first moving operation and the second moving operation, a first operation command when a movement direction of the first moving operation and a movement direction of the second moving operation are substantially the same, and a second operation command when the movement direction of the first moving operation and the movement direction of the second moving operation are not substantially the same; and displaying, on the display, respective results of the initiated commands.

18. An apparatus comprising:

a housing;

a first contact sensor provided on a first surface of the housing and configured to detect a first moving operation of a first operator;

a second contact sensor provided on a second surface of the housing at a different position from the first surface and configured to detect a second moving operation of a second operator;

a controller configured to initiate an operation command in response to the detected first moving operation of the first operator, initiate a command in response to the detected second moving operation of the second operator on the second surface, and initiate, according to a combination of the first moving operation and the second moving operation, a first operation command when a movement direction of the first moving operation and a movement direction of the second moving operation are substantially the same, and a second operation command when the movement direction of the first moving operation and the movement direction of the second moving operation are not substantially the same; and a display provided on a second surface of the housing that is substantially opposite from the first surface and configured to display respective results of the initiated commands.

* * * * *